(12) United States Patent
Gonzalez et al.

(10) Patent No.: US 8,391,832 B2
(45) Date of Patent: Mar. 5, 2013

(54) SYSTEMS, METHODS, AND COMPUTER PROGRAM PRODUCTS FOR PROVIDING SERVICE CREDIT TO CUSTOMER ACCOUNTS IN A WIRELESS COMMUNICATIONS SERVICE NETWORK

(75) Inventors: Lizbet Gonzalez, North Brunswick, NJ (US); Leonard James Burnett, Marietta, GA (US); Todd D. Carlton, Canton, GA (US); William B. Chandler, Jr., Snellville, GA (US); Raymond A. McFarland, Jr., Sachse, TX (US)

(73) Assignee: AT&T Mobility II LLC, Atlanta, GA (US)

( * ) Notice: Subject to any disclaimer, the term of this patent is extended or adjusted under 35 U.S.C. 154(b) by 358 days.

(21) Appl. No.: 12/777,708

(22) Filed: May 11, 2010

(65) Prior Publication Data

US 2011/0281551 A1 Nov. 17, 2011

(51) Int. Cl.
*H04M 11/00* (2006.01)
(52) U.S. Cl. .................. 455/406; 455/407; 455/408
(58) Field of Classification Search ........... 455/406–408
See application file for complete search history.

(56) References Cited

U.S. PATENT DOCUMENTS

| | | | | |
|---|---|---|---|---|
| 2002/0058496 | A1* | 5/2002 | Bos et al. | 455/406 |
| 2003/0008634 | A1* | 1/2003 | Laybourn et al. | 455/407 |
| 2003/0027581 | A1* | 2/2003 | Jokinen et al. | 455/456 |
| 2003/0194988 | A1* | 10/2003 | Knox | 455/406 |
| 2004/0009760 | A1* | 1/2004 | Laybourn et al. | 455/405 |
| 2004/0185827 | A1* | 9/2004 | Parks | 455/406 |
| 2004/0253941 | A1* | 12/2004 | Rivera et al. | 455/408 |
| 2005/0105704 | A1* | 5/2005 | Harrison et al. | 379/114.2 |
| 2008/0182552 | A1* | 7/2008 | Dinh et al. | 455/408 |
| 2010/0041365 | A1* | 2/2010 | Lott et al. | 455/406 |

* cited by examiner

*Primary Examiner* — Nathan Mitchell
(74) *Attorney, Agent, or Firm* — Parks IP Law LLC; Mickki D. Murray, Esq.

(57) ABSTRACT

Systems, methods, and computer program products use combinations of international mobile equipment identity (IMEI), international mobile subscriber identity (IMSI), and account information to determine if a customer is eligible for service credit in near real-time. The customer needs an active account prior to inserting a subscriber identity module (SIM) into a device and powering on the device for the system to determine credit eligibility. No further customer action is required. The credit application process determines credit eligibility based upon device credit eligibility, account tenure, and/or credit rules, and applies the credit to the customer's account. The customer may be proactively notified when the credit is applied. The credit and tenure rules may be changed as the industry and business needs change to remain competitive in the industry. The SIM used is configured with software to lock the SIM to the device upon first power-on.

20 Claims, 9 Drawing Sheets

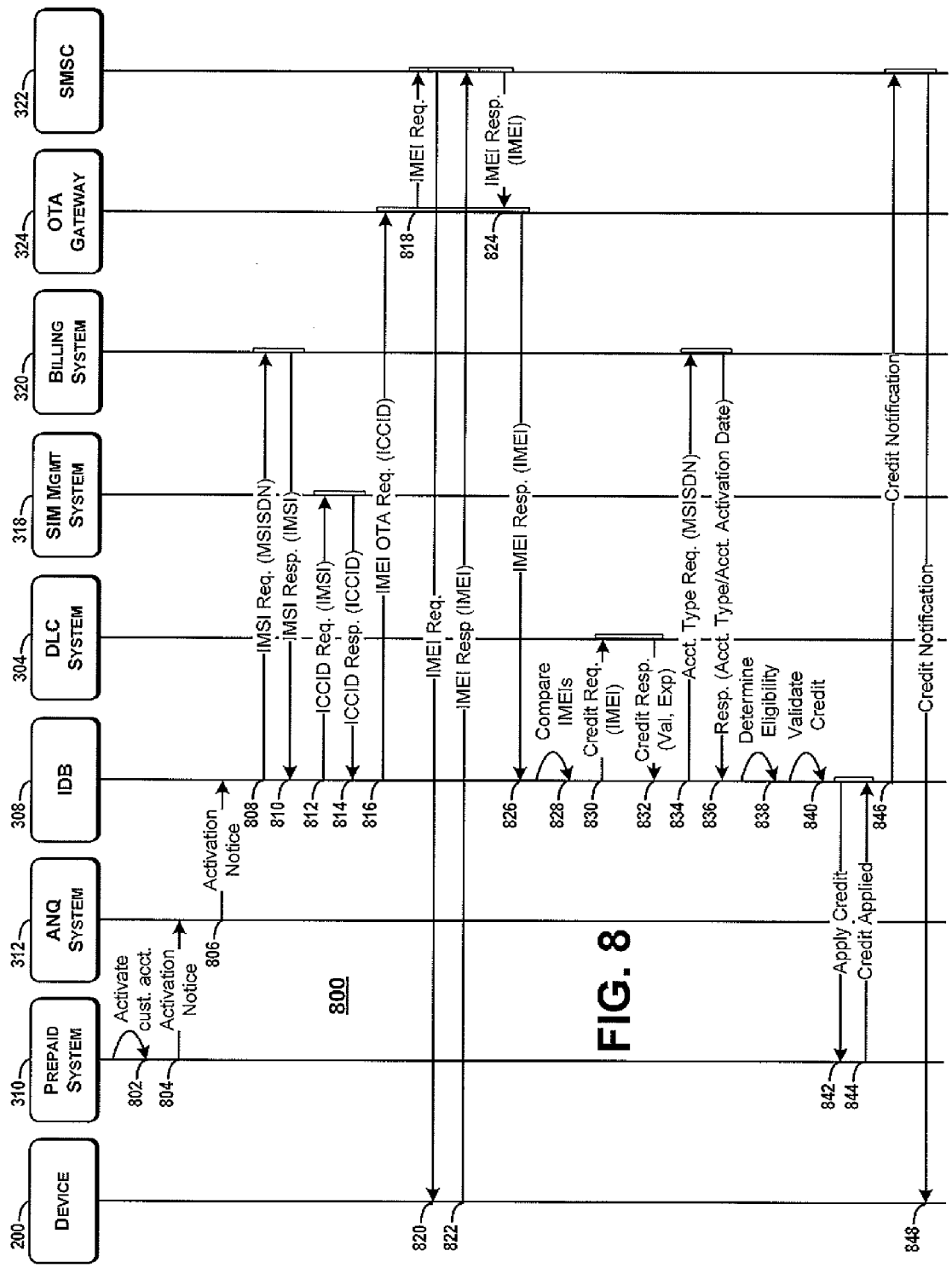

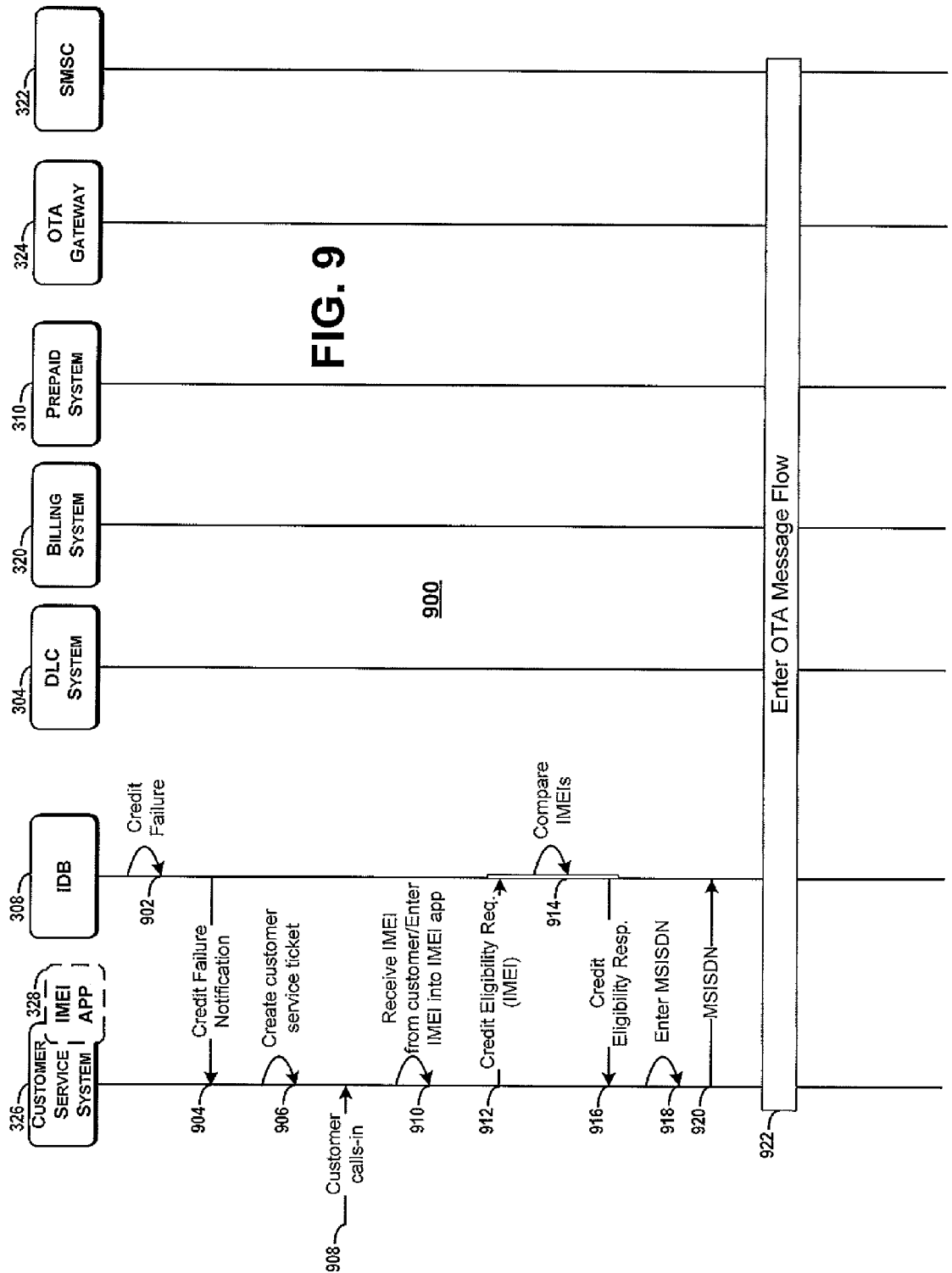

SYSTEMS, METHODS, AND COMPUTER PROGRAM PRODUCTS FOR PROVIDING SERVICE CREDIT TO CUSTOMER ACCOUNTS IN A WIRELESS COMMUNICATIONS SERVICE NETWORK

TECHNICAL FIELD

The present disclosure relates generally to wireless communications service and, more particularly, to providing service credit to customer accounts in a wireless communications service network.

BACKGROUND

Wireless telecommunications services are provided to customers via one of two payment methods—prepaid and postpaid. Postpaid accounts are designed such that if the customer exceeds the number of voice minutes, data capacity, text messages, or other services allocated to their account in a billing cycle, the postpaid customer will be charged for the excess services at the end of the billing cycle. Often times, the customer is unaware of the overage and is requested to pay an unexpected amount at the end of the billing cycle.

Services, such as AT&T's Rollover® service, aim to eliminate overages by accumulating unused minutes at the end of each billing cycle for use in future billing cycles. For example, if a customer uses 900 minutes of a 1000 minute service plan during a billing cycle, the remaining 100 unused minutes are added to the customer's total available Rollover® minutes. If the customer exceeds their 1000 minute service plan during a future billing cycle, the customer's Rollover® account is debited the overage amount of minutes instead of the customer being charged overage fees for the excess minutes. Minutes in a customer's Rollover® account are typically set to expire after a predetermined time, such as every year.

Prepaid customers typically purchase a credit for a predetermined number of voice minutes prior to receiving wireless voice service. By purchasing credit in advance of use on a wireless service network, a customer can access a wireless service network without contractual obligation and an ongoing bill (e.g., re-occurring bill). A customer may then use the wireless network until the expiration of the purchased, or prepaid, credit.

A large percentage of prepaid customers have no intention of using a purchased prepaid device and prepaid plan as designed. Instead, prepaid devices, such as AT&T's GoPhones®, are commonly purchased and used as postpaid replacement devices or upgrades to an existing device. As a result, the assigned subscriber identity modules (SIMs) and the purchased device are "broken apart." This inflates the number of account cancellations and churn results for the prepaid product.

SUMMARY

The present disclosure relates, in part, to a method for applying a service credit to a new customer account in a wireless telecommunications network. The method includes receiving an activation notice. The activation notice includes a first mobile subscriber integrated services digital network (MSISDN). The activation notice is transmitted to an indefeasible bundle (IDB) system in response to the new customer account being activated in a prepaid system. The method also includes receiving a trigger message from a device associated with the new customer account. The trigger message includes an international mobile equipment identity (IMEI) of the device, an international mobile subscriber identity (IMSI) stored in a subscriber identity module (SIM) installed in the device, and a second MSISDN. The method also includes comparing the first MSISDN and the second MSISDN to determine if the first MSISDN and the second MSISDN match. If the first MSISDN and the second MSISDN do not match, the method includes denying application of the service credit. If the first MSISDN and the second MSISDN match, the method includes comparing the IMEI received in the trigger message to an IMEI list generated by the IDB system, the IMEI list including a plurality of IMEIs, each of which identifies a particular device that is eligible to receive service credit. If the IMEI received in the trigger message does not match one of the plurality of IMEIs in the IMEI list, the method includes denying application of the service credit. If the IMEI received in the trigger message matches one of the plurality of IMEIs in the IMEI list, the method includes generating a first integrated circuit card identifier (ICCID) request and transmitting the first ICCID request to a device lifecycle (DLC) system. The first ICCID request includes the IMEI as a query parameter to be used by the DLC system to retrieve a first ICCID associated with the IMEI and a credit value of the service credit available for the IMEI. The method also includes receiving a first ICCID response. The first ICCID response includes the ICCID associated with the IMEI and the credit value available for the IMEI. The method also includes generating a second ICCID request and transmitting the second to a SIM management system. The second ICCID request includes the IMSI as a query parameter to be used by the SIM management system to retrieve a second ICCID associated with the IMSI. The method also includes receiving a second ICCID response that includes the second ICCID associated with the IMSI. The method also includes comparing the first ICCID and the second ICCID. If the first ICCID and the second ICCID do not match, the method also includes denying application of the service credit. If the first ICCID and the second ICCID match, the method also includes generating an apply service credit request and transmitting the apply service credit request to the prepaid system. The apply service credit request includes the credit value received from the DLC system. The method also includes receiving an apply service credit response from the prepaid system. The apply service credit response includes a notification from the prepaid system that the credit value of the service credit has been applied to the new customer account.

In one embodiment, the method also includes receiving the activation notice from an activation notice queuing system configured to receive a plurality of activation notices from the prepaid system as accounts are activated and send the activation notices to the IDB system based upon an order of each activation notice of the plurality of activation notices established in an activation notice queue.

In one embodiment, the method also includes receiving the trigger message from the device based upon a power-on event trigger application stored on the SIM generating the trigger message in response to the device being powered-on for the first time with the SIM installed.

In one embodiment, the method also includes generating the IMEI list prior to the device being offered far sale. In one embodiment, generating the IMEI list prior to the device being offered for sale is based upon a determination of which IMEIs in a credit eligible IMEI list have received a credit. In one embodiment, the IMEIs in the credit eligible IMEI list are each paired with a particular ICCID of a particular SIM that is packaged together with a particular device associated with each IMEI in the credit eligible list prior to the device being offered for sale.

In one embodiment, if the first ICCID and the second ICCID match and prior to generating the apply service credit request, the method also includes generating an account information request and transmitting the account information request to a billing system. The account request includes the matched MSISDN received in as a query parameter to be used by the billing system to retrieve account information associated with the matched MSISDN. The method also includes receiving an account information response including the account information associated with the matched MSISDN. The method also includes determining, based upon business rules stored in the IDB system, whether to permit or deny application of the service credit. The business rules include at least one of account type-based rules and tenure-based rules. Account type-based rules employ one of a list of all account types that are not eligible for service credit and a list of all account types that are eligible for service credit to determine whether to permit or deny application of the service credit. Tenure-based rules enforce credit eligibility for customer accounts based upon at least one of a time during which a particular customer account has been active and a time since a particular customer account has been given service credit.

In one embodiment, the method also includes sending a credit notification to the device to notify a customer associated with the device that the service credit has been applied to the new customer account.

The method may be embodied as instructions on a tangible computer-readable medium for execution by a processor.

A system configured to execute the steps of the method is also contemplated.

Other aspects of the present disclosure will be in part apparent and in part pointed out hereinafter.

BRIEF DESCRIPTION OF THE DRAWINGS

FIG. 8 schematically illustrates an exemplary message flow for setting up a service credit without receiving a trigger event at the IDB system, according to an embodiment of the present disclosure.

FIG. 9 schematically illustrates an exemplary message flow for handling customer requests for credit resubmission, according to an exemplary embodiment of the present disclosure.

DETAILED DESCRIPTION

Figure 1:
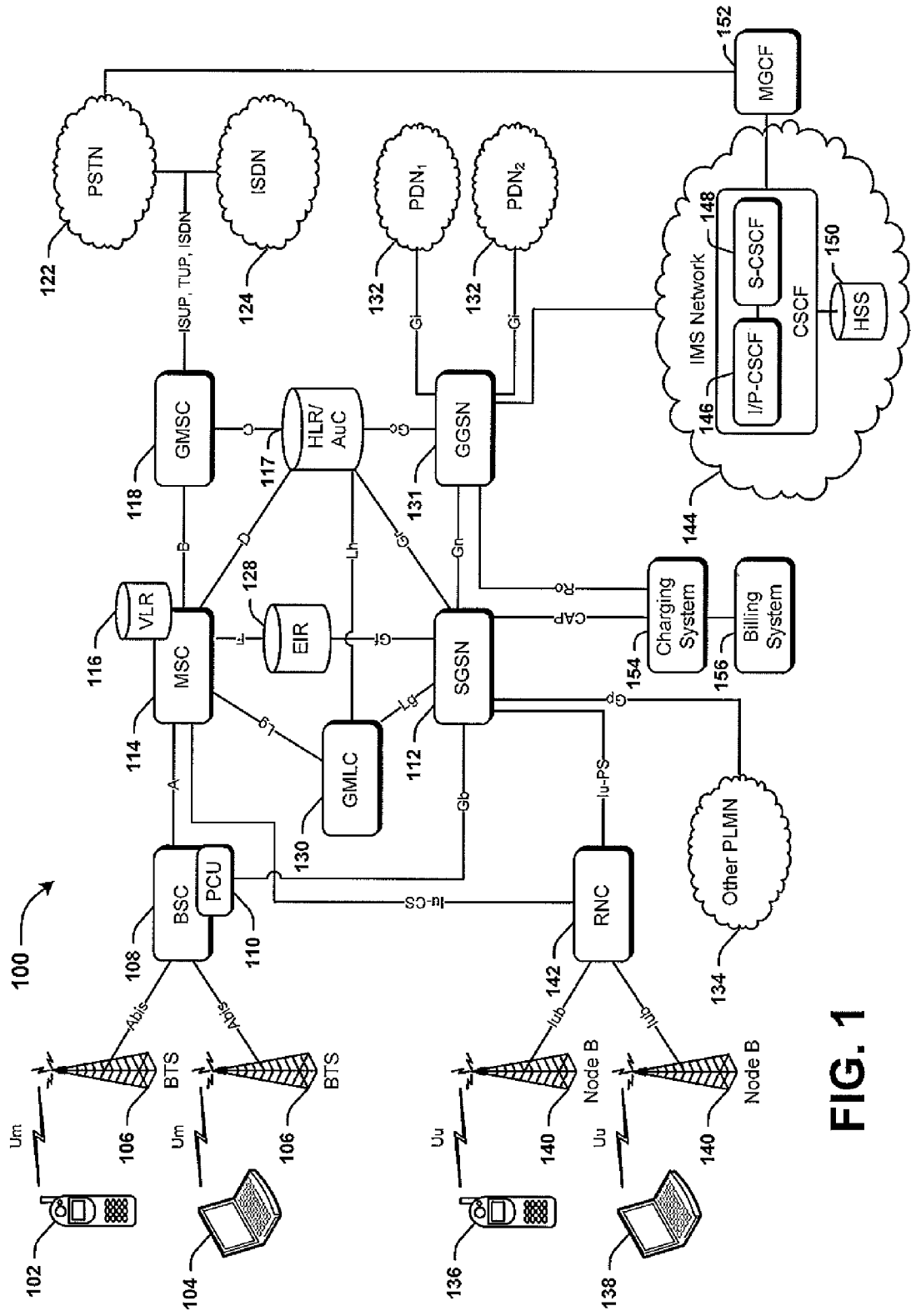
FIG. 1 schematically illustrates an exemplary Global System for Mobile communications (GSM) and Universal Mobile Telecommunications System (UMTS) network in which embodiments of the present disclosure may be implemented.

As required, detailed embodiments of the present disclosure are disclosed herein. It must be understood that the disclosed embodiments are merely exemplary examples of the disclosure that may be embodied in various and alternative forms, and combinations thereof. As used herein, the word "exemplary" is used expansively to refer to embodiments that serve as an illustration, specimen, model or pattern. The figures are not necessarily to scale and some features may be exaggerated or minimized to show details of particular components. In other instances, well-known components, systems, materials or methods have not been described in detail in order to avoid obscuring the present disclosure. Therefore, specific structural and functional details disclosed herein are not to be interpreted as limiting, but merely as a basis for the claims and as a representative basis for teaching one skilled in the art to variously employ the present disclosure.

The systems, methods, and computer program products described herein may be implemented in wireless networks that use exemplary telecommunications standards such as Global System for Mobile communications (GSM) and Universal Mobile Telecommunications System (UMTS). It should be understood, however, that the systems, methods, and computer program products described herein may alternatively be implemented in wireless networks that use any existing or yet to be developed telecommunications technology. Some examples of other suitable telecommunications technologies include, but are not limited to, networks utilizing Time Division Multiple Access (TDMA), Frequency Division Multiple Access (FDMA), Wideband Code Division Multiple Access (WCDMA), Orthogonal Frequency Division Multiplexing (OFDM), Long Term Evolution (LTE), WIMAX and various other 2G, 2.5G, 3G, 4G, and greater generation technologies. Examples of suitable data bearers include, but are not limited to, General Packet Radio Service (GPRS), Enhanced Data rates for Global Evolution (EDGE), the High-Speed Packet Access (HSPA) protocol family such as, High-Speed Downlink Packet Access (HSDPA), Enhanced Uplink (EUL) or otherwise termed High-Speed Uplink Packet Access (HSUPA), Evolved HSPA (HSPA+), and various other current and future data bearers.

While the message flows, processes or methods described herein may, at times, be described in a general context of computer-executable instructions, the message flows, processes or methods of the present disclosure can also be implemented in combination with other program modules and/or as a combination of hardware and software. The term "application," or variants thereof, is used expansively herein to include routines, program modules, programs, components, data structures, algorithms, service, and the like. Applications can be implemented on various system configurations including servers, network systems, single-processor or multiprocessor systems, minicomputers, mainframe computers, personal computers, hand-held computing devices, mobile devices, microprocessor-based consumer electronics, programmable electronics, network elements, gateways, network functions, devices, combinations thereof, and the like.

Referring now to the drawings in which like numerals represent like elements throughout the several views, FIG. 1 schematically illustrates an exemplary GSM/UMTS network 100. The wireless communications network 100 includes two radio access networks (RANs). A first RAN, illustrated in the upper left hand portion of FIG. 1, is dedicated to GSM-based radio access. A second RAN, illustrated in the lower left hand portion of FIG. 1, is dedicated to UMTS-based network access. The innovative aspects of the present disclosure may be implemented in networks that use alternative access technologies such as those described above. The first RAN is now described.

The illustrated wireless communications network 100 includes a first mobile station (MS) 102 and a second MS 104 that are each in communication with a base transceiver station (BTS) 106 via an Um radio (air) interface. The BTSs 106 are terminating nodes for the radio interface in the illustrated first RAN. Each BTS 106 includes one or more transceivers and is responsible for ciphering of the radio interface.

In the illustrated embodiment, the first MS 102 is a mobile device and the second MS 104 is a computer such as a laptop with an integrated or external, removable GSM access card. Each MS 102, 104 includes mobile equipment, such as, but not limited to, one or more of keyboards, screens, touch screens, multi-touch screens, radio transceivers, circuit boards, processors, memory, subscriber identity modules (SIM), universal SIMs (USIM), or universal integrated circuit card (UICC) that contains subscriber information to enable network access to the wireless communications network 100, and the like.

Each BTS 106 is in communication with a base station controller (BSC) 108 via an Abis interface. Typically, a BSC has tens or even hundreds of BTSs under its control. The BSC 108 is configured to allocate radio resources to the MSs 102, 104, administer frequencies, and control handovers between BTSs 106 (except in the case of an inter-Mobile Switching Center (MSC) handover in which case control is in part the responsibility of the MSC). One function of the BSC 108 is to act as a concentrator, so that many different low capacity connections to the BTS 106 become reduced to a smaller number of connections towards the MSC. Generally, this means that networks are often structured to have many BSCs 108 distributed into regions near the BTSs 106 and connected to large centralized MSC sites. Although illustrated as a distinct element, the functions provided by the BSC 108 may alternatively be incorporated in the BTS 106. The Abis interface is eliminated in such a configuration.

The BSC 108 is logically associated with a packet control unit (PCU) 110 when GPRS capabilities are employed. The PCU 110 is configured to support radio related aspects of GPRS when connected to a GSM network. The PCU 110 is in communication with a serving GPRS support node (SGSN) 112 via a Gb interface. The SGSN 112 records and tracks the location of each mobile device (e.g., MSs 102, 104) in the wireless communications network 100. The SGSN 112 also provides security functions and access control functions.

The BSC 108 is also in communication with an MSC 114 via an A interface. The MSC 114 is configured to function as a telecommunications switch. The MSC 114 is in communication with location databases such as a visiting location register (VLR) 116 and a home location register (HLR) 117. The VLR 116 may be logically associated with the MSC 114 as illustrated or may be provided as a separate network element in communication with the MSC 114. The VLR 116 is a database configured to store all subscriber data that is required for call processing and mobility management for mobile subscribers that are currently located in an area controlled by the VLR 116.

The HLR 117 is in communication with the MSC 114 and VLR 116 via the D interface. The HLR 117 is a database configured to provide routing information for mobile terminated calls and various messaging communications. The HLR 117 is also configured to maintain subscriber data that is distributed to the relevant VLR (e.g., the VLR 116) or the SGSN 112 through an attach process and to provide mobility management procedures, such as location area and routing area updates. The HLR 117 may be logically associated with an authentication center (AuC) as illustrated, or the AuC may be provided as a separate network element in communication with the HLR 117.

The AuC is configured to authenticate each UICC/SIM/USIM that attempts to connect to the wireless telecommunications network 100, for example, when a mobile device is powered on. Once authenticated, the HLR 117 is allowed to manage the UICC/SIM/USIM and services provided to the MS 102, 104. The AuC is capable of generating an encryption key that is used to encrypt all wireless communications between the MS 102, 104 and the wireless communications network 100.

The MSC 114 is also in communication with a gateway MSC (GMSC) 118 via a B interface. The GMSC 118 is configured to provide an edge function within a public land mobile network (PLMN), such as the illustrated GSM/UMTS network 100. The GMSC 118 terminates signaling and traffic from a public switched telephone network (PSTN) 122 and an integrated service digital network (ISDN) 124, and converts the signaling and traffic to protocols employed by the mobile network. The GMSC 118 is in communication with the HLR/AuC 117 via a C interface to obtain routing information for mobile terminated calls originating from fixed network devices such as, for example, landline telephones that are in communication with the mobile network via the PSTN 122.

The MSC 114 is also in communication with an equipment identity register (EIR) 128 via an F interface. The EIR 128 is a database that can be configured to identify subscriber devices that are permitted to access the network 100 an international mobile equipment identity (IMEI). An IMEI uniquely identifies a mobile device internationally. An IMEI is allocated to each device by the OEM, registered by the wireless service provider and stored in the EIR 128. Each IMEI includes a type approval code, a final assembly code, a serial number, and a spare digit. The IMEI can also provide the hardware and software capabilities of a device as well as the manufacturer and manufacturing date of the device. IMEIs are typically placed in the EIR 128 once its operation has been certified for the infrastructure of the network 100 in a laboratory or validation facility. The EIR 128 may alternatively be in communication with an external IMEI database to retrieve IMEI information. The IMEI database may alternatively be configured as part of the EIR 128.

The SGSN 112 and the MSC 114 are also in communication with a gateway mobile location center (GMLC) 130 via an Lg interface. The GMLC 130 can communicate with the HLR/AuC 117 via an Lh interface to acquire routing information.

The EIR 128 and the HLR/AuC 117 are each in communication with the SGSN 112 via a Gf interface and a Gr interface, respectively. The SGSN 112, in turn, is in communication with a gateway GPRS support node (GGSN) 131 via a Gn interface. The GGSN 131 is configured to provide an edge routing function within a GPRS network to external packet data networks (PDNs) 132, such as networks providing IP multimedia subsystem (IMS), multimedia messaging service (MMS), wireless application protocol (WAP) access, Internet access, and visual voicemail (VVM) services, for example.

The GGSN 131 is in communication with the PDNs 132 via a Gi interface. The GGSN 131 includes firewall and filtering functionality. The HLR/AuC 117 is in communication with the GGSN 131 via the Gc interface.

The SGSN 112 is also in communication with other PLMNs 134 via an external GGSN (not shown). The external GGSN provides access to the other PLMNs 134. The other PLMNs 134 may be, for example, a foreign network such as a wireless telecommunications network operated by another service provider or the same service provider as the illustrated network 100.

The second RAN, illustrated in the lower left hand portion of FIG. 1, is dedicated to UMTS-based radio access and is now described. The illustrated wireless communications network 100 also includes a first user equipment (UE) 136 and a second UE 138 that are each in communication with a Node B 140 via a Uu radio (air) interface. The node B 140 is the terminating node for the radio interface in the second RAN. Each Node B 140 includes one or more transceivers for transmission and reception of data across the Uu radio interface. Each node B 140 is configured to apply codes to describe channels in a CDMA-based UMTS network. Generally, the node B 140 performs similar functions for the UMTS network (or similarly for an LTE network) that the BTS 106 performs for the GSM network.

In the illustrated embodiment, the first UE 136 is a mobile phone (e.g., the mobile device 102, 800) and the second UE 138 is a computer such as a laptop with an integrated or external, removable UMTS card. Each UE 136, 138 includes mobile equipment such as one or more of keyboards, screens, touch screens, multi-touch screens, radio transceivers, circuit boards, processors, memory, SIMs, USIMs, or UICCs that contains subscriber information to enable network access to the wireless communications network 100, and the like. Generally, the UEs 136, 138 perform similar functions in the UMTS network that the MSs 102, 104 perform in the GSM network.

Each node B 140 is in communication with a radio network controller (RNC) 142 via a Iub interface. The RNC 142 is configured to allocate radio resources to the UEs 136, 138, administer frequencies, and control handovers between node Bs 140 (and others not shown). Although illustrated as a distinct element, the RNC 142 functions may alternatively be located within the node Bs 140. In this configuration the Iub interface is eliminated. Generally, the RNC 142 performs similar functions for the UMTS network that the BSC 108 performs for the GSM network.

The RNC 142 is in communication with the MSC 114 via an Iu-CS interface. The RNC 142 is also in communication with the SGSN 112 via an Iu-PS interface. The other network elements perform the same functions for the UMTS network as described above for the GSM network.

The network 100 also includes an IP multimedia subsystem (IMS) network 144. The IMS network 144 includes call state control functions (CSCFs) such as a proxy-CSCF (P-CSCF), an interrogating-CSCF (I-CSCF), and a serving-CSCF (S-CSCF). The P-CSCF is the first contact point in the IMS network 144 for a UE 136, 138 and routes incoming communications to the I-CSCF. The I-CSCF determines which S-CSCF is serving the communication and routes the communication to that S-CSCF, which performs registration, session control, and application interface functions. The P-CSCF and the I-CSCF are illustrated as a combined I/P-CSCF 146 and the S-CSCF 148 is illustrated as a stand-alone element. Other CSCF configurations are contemplated.

The IMS network 144 also includes a home subscriber server (HSS) 150, which is a master user database that supports the IMS network 144 core network elements. The HSS 150 stores subscription-related information, such as subscriber account details and subscriber profiles, performs authentication and authorization of the user, and provides information about a subscriber's location and IP address. It is similar to the GSM HLR and AuC, described above as the combination HLR/AuC 117.

The IMS network 144 also includes a media gateway control function (MGCF) 152, which provides call control protocol conversions between the ISDN user part (ISUP) protocol used by the PSTN 122 and the session initiation protocol (SIP) used by the IMS network 144.

Referring back to the SGSN 112, it is shown that the SGSN 112 is in communication with a charging system 154 via a CAP interface. The GGSN 131 is also in communication with the charging system 154 via an Ro interface. The charging system 154, in turn, is in communication with a billing system 156.

Briefly, the charging system 154 is responsible for offline and online charging of subscriber accounts. The charging system 154 may be deployed to provide charging rule functions for prepaid and/or postpaid network platforms. The single charging system 154 is illustrated for simplicity; however, separate charging systems are contemplated and may be utilized if desired by the wireless service provider.

The billing system 156 is responsible for billing postpaid customers and handling payments received for service provisioned for both postpaid and prepaid accounts in the network 100. Like the charging system 154, the billing system 156 may alternatively be designed as two separate entities for postpaid and prepaid applications.

Figure 2:
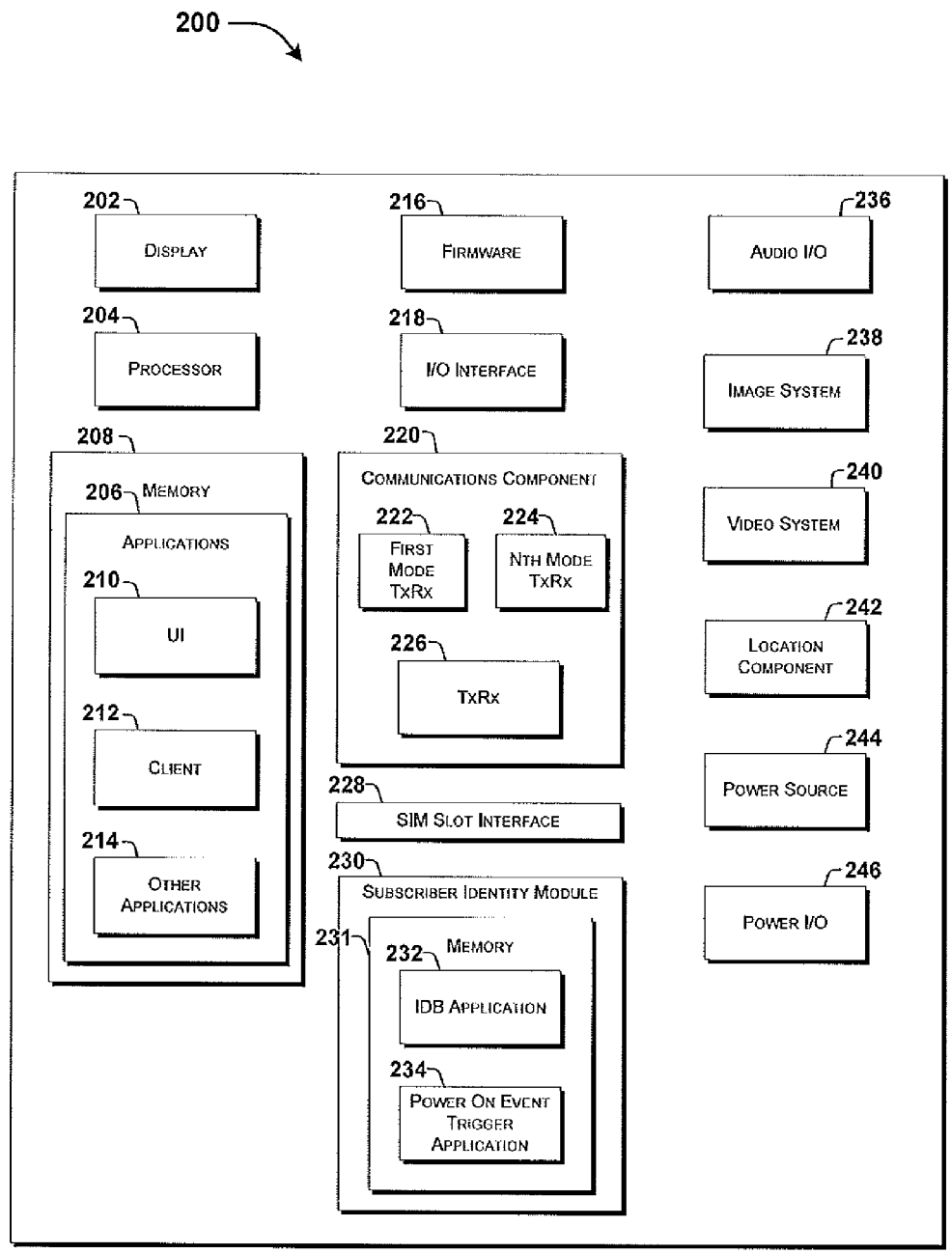
FIG. 2 schematically illustrates an exemplary mobile communications device and components thereof, according to an embodiment of the present disclosure.

Referring now to FIG. 2, a schematic block diagram of an exemplary mobile device 200 is illustrated. Although connections are not shown between the components illustrated in FIG. 2, the components can interact with each other to carry out device functions. In some embodiments, for example, the components are arranged so as to communicate via one or more busses (not shown). It should be understood that FIG. 2 and the following description are intended to provide a general understanding of a suitable environment in which various aspects of embodiments of the present disclosure can be implemented.

In some embodiments, the mobile devices 102, 104, 136, 138 illustrated in FIG. 1 are configured like the mobile device 200 described in connection with FIG. 2. According to embodiments of the present disclosure, the mobile device 200 is manufactured by an original equipment manufacturer (OEM) and packaged with a subscriber identity module (SIM) by the OEM or a third party. The package is assigned a stock-keeping unit (SKU) to distinctly identify the unique combination of a mobile device (identified by an IMEI) and a SIM (identified by an integrated circuit card identifier (IC-CID)).

In some embodiments, the mobile device 200 is a multi-mode headset configured to provide access to more than one network type including, for example, the telecommunications technologies described above and/or other technologies such as Wi-Fi™.

In some embodiments, the mobile device 200 includes computer-readable media, including, for example, volatile media, non-volatile media, removable media, and non-removable media. The term "computer-readable media" and variants thereof, as used in the specification and claims, refer to storage media and communication media. In some embodiments, storage media includes volatile and/or non-volatile, removable, and/or non-removable media. For example, storage media includes random access memory (RAM), read-only memory (ROM), electrically erasable programmable read-only memory (EEPROM), solid state memory or other memory technology, CD ROM, DVD, or other optical disk storage, magnetic tape, magnetic disk storage or other magnetic storage devices, or any other tangible medium that can be used to store the desired information and that can be accessed by the mobile device 200.

As illustrated in FIG. 2, the mobile device 200 includes a display 202 for displaying multimedia such as, for example, short messaging service (SMS) messages, multimedia messaging service (MMS) messages, customer service messages, over-the-air (OTA) messages, unstructured supplementary service data (USSD) messages, voicemail notification messages, application graphical user interfaces (GUIs), text, images, video, telephony functions, such as Caller ID data, setup functions, menus), music, metadata, wallpaper, graphics, Internet content, device status, preferences settings, map and location data, profile (e.g., vibrate, silent, loud) selection, and the like.

The illustrated mobile device 200 also includes a processor 204 for processing data and/or executing computer-executable instructions of one or more applications 206 stored in a memory 208. In some embodiments, the application(s) 206 include a user interface (UI) application 210. The UI application 210 interfaces with a client 212 (e.g., an operating system (OS)) to facilitate user interaction with device functionality and data. In some embodiments, the client 212 is one of Symbian OS, Microsoft® Windows® Mobile OS (available from Microsoft Corporation of Redmond, Wash.), Palm® webOS™ (available from Palm Corporation of Sunnyvale, Calif.), Palm®OS (available from Palm Corporation), RIM® BlackBerry® OS (available from Research In Motion Limited of Waterloo, Ontario, Canada), Apple® iPhone® OS (available from Apple Corporation of Cupertino, Calif.), or Google Android™ OS (available from Google Inc. of Mountain View, Calif.). These operating systems are merely exemplary of the operating systems that may be used in accordance with the embodiments disclosed herein.

The UI application 210 aids a user in activating service OTA, if applicable, entering message content, viewing received messages (e.g., MMS messages, SMS messages, USSD messages, OTA messages), answering/initiating calls, entering/deleting data, entering and setting user IDs and passwords for device access, configuring settings, manipulating address book content and/or settings, multimode interaction, interacting with other applications 214, and the like. In some embodiments, the other applications 214 include, for example, visual voicemail applications, messaging applications (e.g., SMS, enhanced messaging service (EMS), MMS applications), presence applications, text-to-speech applications, speech-to-text applications, add-ons, plug-ins, email applications, music applications, video applications, camera applications, location service applications (LSAs), power conservation applications, game applications, productivity applications, entertainment applications, enterprise applications, combinations thereof, and the like. The applications 208 are stored in the memory 208 and/or in a firmware 216, and are executed by the processor 204. The firmware 216 may also store code for execution during device power up and power down operations.

The illustrated mobile device 200 also includes an input/output (I/O) interface 218 for input/output of data, such as, for example, location information, presence status information, user IDs, passwords, and application initiation (start-up) requests. In some embodiments, the I/O interface 218 is a hardwire connection, such as, for example, a USB, mini-USB, audio jack, PS2, IEEE 1394, serial, parallel, Ethernet (RJ48) port, RJ11 port, or the like. In some embodiments, the I/O interface 218 accepts other I/O devices such as, for example, keyboards, keypads, mice, interface tethers, stylus pens, printers, thumb drives, touch screens, multi-touch screens, touch pads, trackballs, joysticks, microphones, remote control devices, monitors, displays, liquid crystal displays (LCDs), combinations thereof, and the like. It should be appreciated that the I/O interface 218 may be used for communications between the mobile device 200 and a network device or local device, instead of, or in addition to, a communications component 220.

The communications component 220 interfaces with the processor 204 to facilitate wired/wireless communications with external systems. Example external systems include, but are not limited to, intranets, network databases, network storage systems, cellular networks, location servers, presence servers, Voice over Internet Protocol (VoIP) networks, local area networks (LANs), wide area networks (WANs), metropolitan area networks (MANs), personal area networks (PANs), and other networks and systems described herein. In some embodiments, the external systems are implemented using Wi-Fi™, WIMAX, combinations and/or improvements thereof, and the like. In some embodiments, the communications component 220 includes a multimode communications subsystem for providing cellular communications via different cellular technologies. In some embodiments, for example, a first cellular transceiver 222 operates in one mode, such as, GSM, and an Nth cellular transceiver 224 operates in a different mode, such as UMTS. While only two cellular transceivers 222, 224 are illustrated, it should be appreciated that a plurality of transceivers can be included.

The illustrated communications component 220 also includes an alternative communications transceiver 226 for use by other communications technologies such as, for example, Wi-Fi™, Wi-Max™, BLUETOOTH, infrared, infrared data association (IRDA), near field communications (NFC), RF, and the like. In some embodiments, the communications component 220 also facilitates reception from terrestrial radio networks, digital satellite radio networks, Internet-based radio services networks, combinations thereof, and the like.

The communications component 220 processes data from a network such as, for example, the Internet, an intranet (e.g., business intranet), a home broadband network, a Wi-Fi™ hotspot, and the like, via an Internet service provider (ISP), digital subscriber link (DSL) provider, or broadband provider. In some embodiments, the communications component 220 facilitates the transmission of authentication information from the mobile device 200 to a network for processing in accordance with the methods described herein.

The illustrated mobile device 200 also includes a SIM slot interface 228 for accommodating a SIM 230 such as, for example, a SIM card, a universal SIM (USIM) card, or a universal integrated circuit card (UICC) including one or more SIM applications (e.g., ISIM, SIM, USIM, CSIM). The SIM 230 may be programmed by the OEM of the SIM and packaged with the mobile device 200 such that the IMEI of the mobile device 200 and the ICCID of the SIM 230 are combined into a package and assigned a SKU.

The SIM 230 also stores an international mobile subscriber identity (IMSI). The mobile device 200 can only be operated if the SIM 230 includes a valid IMSI and is inserted into the SIM slot interface 228 of the mobile device 200 with a valid IMEI. An IMSI includes a maximum of fifteen decimal places divided among a mobile country code (MCC), a mobile network code (MNC), and a mobile subscriber identification number (MSIN). The MCC includes three decimal places to identify the operating country of the subscriber associated with the IMSI. The MNC includes two decimal places to identify the network within the operating country to which the IMSI is registered. The MSIN includes a maximum of ten decimal places to uniquely identify the subscriber in the home PLMN.

The SIM 230 includes a SIM memory 231 configured to store the IMSI, an indefeasible bundle (IDB) application 232, and a power-on event trigger application 234. The SIM memory 231 may also store other information such as contact information, device settings, SIM application settings, other applications, and the like.

The IDB application 232 may be loaded into the SIM memory 231 prior to the SIM 230 being packaged with the mobile device 200. The IDB application 232 includes instructions for pairing the IMEI of the mobile device 200 to the ICCID of the SIM 230 when the SIM 230 is inserted into the SIM slot interface 228 and the mobile device 200 is powered-on for the first time. The IMSI, being stored in the SIM memory 231, is also paired with the IMEI at this time. An exemplary message flow depicting this process is described herein below with reference to FIG. 6.

The power-on event trigger application 234 includes instructions for generating a power-on event trigger ("trigger") upon or shortly after the mobile device 200 being powered-on. The mobile device 200 is configured to receive the trigger from the SIM 230 and send it to an IMEI trigger system (illustrated in FIG. 3 as element 316) via the communications component 220.

The trigger includes the IMEI and the IMSI paired during the power-on operation. The trigger also includes a mobile subscriber integrated services digital network number/mobile station subscriber directory number (MSISDN) assigned to the mobile device 200. The SIM 230 may be associated with one or more MSISDNs depending upon the capabilities of the SIM. Each MSISDN is structured according to the international ISDN numbering plan. As such, the MSISDN passed in the trigger includes a country code (CC) of up to three decimal places, a national destination code (NDC) of two or three decimal places, and a subscriber number (SN) of up to a maximum ten decimal places. The MSISDN may be a real MSISDN or a dummy MSISDN depending on whether the mobile device 200 has already been associated with an active account. For example, the mobile device 200 may send a dummy MSISDN in the trigger if the mobile device 200 is powered-on prior to being associated with an active account.

Audio capabilities for the mobile mobile device 200 may be provided by an audio I/O component 236 that includes a speaker for the output of audio signals and a microphone to collect audio signals.

The mobile mobile device 200 may also include an image capture and processing system 238 (image system). Photos may be obtained via an associated image capture subsystem of the image system 238, for example, a camera. The mobile device 200 may also include a video system 240 for capturing, processing, recording, modifying, and/or transmitting video content. Photos and videos obtained using the image system 238 and the video system 240, respectively, may be added as message content to an MMS message and sent to another mobile device.

The illustrated mobile device 200 also includes a location component 242 for sending and/or receiving signals such as, for example, GPS data, assisted GPS (A-GPS) data, Wi-Fi™/ Wi-Max™ and/or cellular network triangulation data, combinations thereof, and the like, for determining a location of the mobile device 200. The location component 242 may communicate with the communications component 220 to retrieve triangulation data for determining a location. In some embodiments, the location component 242 interfaces with cellular network nodes, telephone lines, satellites, location transmitters and/or beacons, wireless network transmitters and receivers, for example, Wi-Fi™ hotspots, radio transmitters, combinations thereof, and the like. Using the location component 242, the mobile device 200 obtains, generates, and/or receives data to identify its location, or transmits data used by other devices to determine the location of the mobile device 200.

The illustrated mobile device 200 also includes a power source 244, such as batteries and/or other power subsystem (AC or DC). The power source 244 may interface with an external power system or charging equipment via a power I/O component 246.

Figure 3:
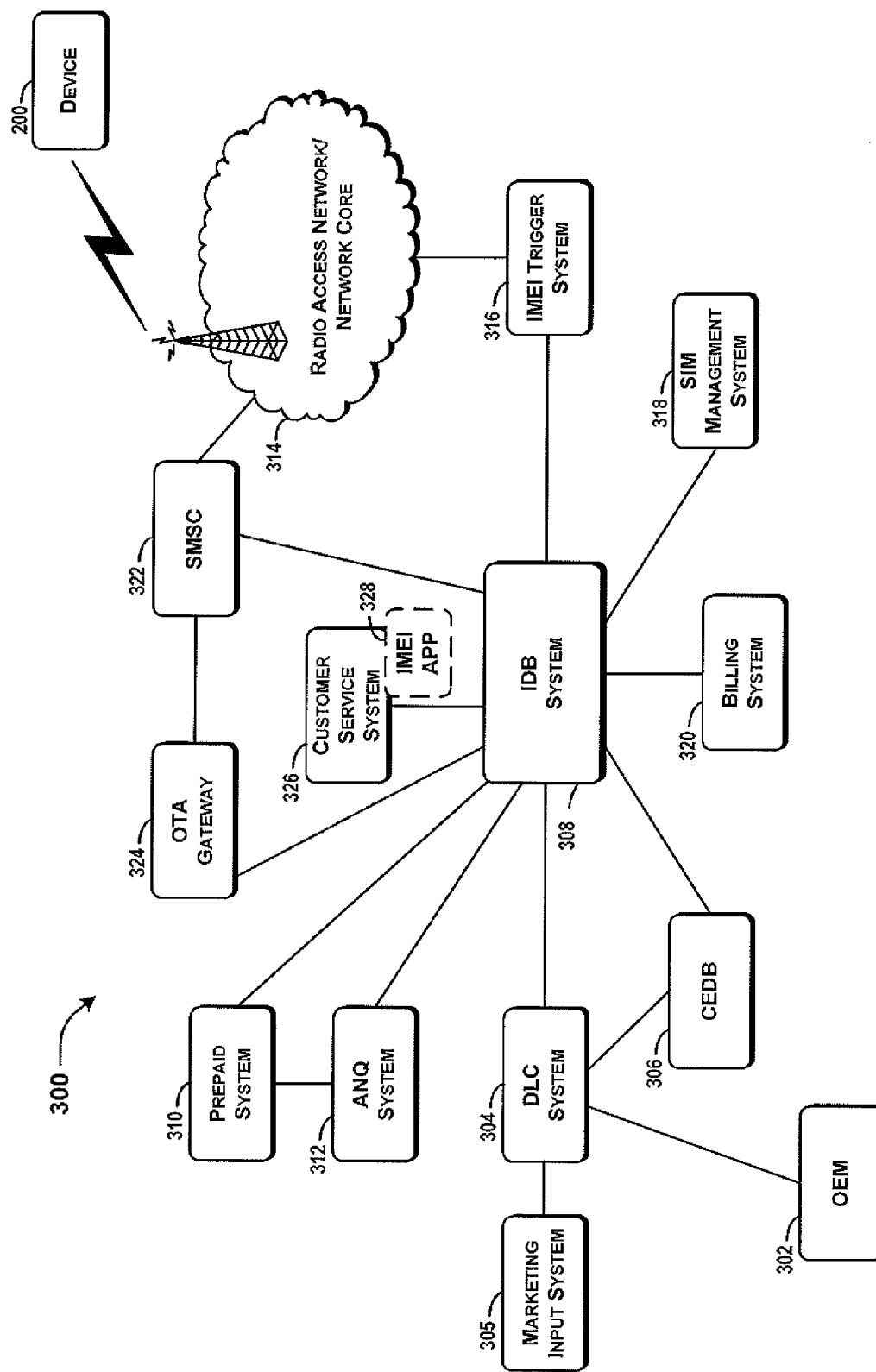
FIG. 3 schematically illustrates an exemplary systems network in which embodiments of the present disclosure may be implemented.

Referring now to FIG. 3, an exemplary systems network 300 is illustrated. The illustrated systems network 300 includes a plurality network elements for performing the functions described herein below with reference to the message flow diagrams illustrated in FIGS. 5-9. Each network element is briefly described below. Additional, more particular, details are provided below with reference to the aforementioned message flow diagrams.

Original Equipment Manufacturer (OEM)

The OEM 302 includes the manufacturing facilities needed to manufacture devices and/or SIMs. In addition, and more particular to the functionality described herein, the OEM 302 includes a system for communicating with a wireless service provider to share information related to the device/SIM combinations packaged by or for the OEM 302. As such, in one embodiment, the OEM 302 provides a system including a combination of hardware and software configured to perform operations related to the assignment of SKUs to device/SIM packages and the transmission of SKU information to the wireless service provider. The OEM 302 is configured to perform operations during a credit value setup process, as described in further detail herein with reference to FIG. 5.

Devices, such as the mobile device 200, are manufactured by the OEM 302. The OEM 302 may also manufacture SIMs loaded with an IDB application, such as the IDB application 232 described above with reference to FIG. 2. The SIMs may alternatively be manufactured by a second OEM (not shown) and transported (e.g., shipped) to the OEM 302 for packaging with a device. In other embodiments, the SIMs and devices are transported to a third party for packaging. In any case, the device/SIM package is assigned a SKU number. The package is labeled with barcodes identifying the IMSI stored in the SIM, the ICCID of the SIM included in the package, the IMEI of the device included in the package, and the SKU.

The OEM 302, or the third party responsible for packaging the device/SIM combinations, generates a SKU list with the IMEI/ICCID pairs for all assigned SKUs. The SKU list may be generated each time a shipment of device/SIM packages is sent to a wireless service provider, by request from the wireless service provider, or at the discretion of either party. The OEM 302 transmits the SKU list to the wireless service provider, for example, via a product intake system at a warehouse operated by or for the wireless service provider (not illustrated). The SKU list is then loaded by the wireless service provider into a device lifecycle (DLC) system 304 for device tracking purposes. In an alternative embodiment, the OEM 302 transmits the SKU list directly to the DLC system 304.

Device Lifecycle (DLC) System and Marketing Input System

In one embodiment, the DLC system 304 is a combination of hardware and software configured to perform operations related to the management of credit values and credit value expirations for each SKU. The DLC system 304 is configured to perform operations during a credit value setup process, a new account credit value activation process, and an upgrade credit value activation process, among other processes described herein. An exemplary credit value setup process, an exemplary new account credit value activation process, and an exemplary upgrade credit value activation process are described in further detail herein with reference to FIGS. 5-7, respectively.

During a credit value setup process, the DLC system 304 communicates with a marketing input system 305 to receive a credit value for prepaid and/or postpaid customers for each SKU in the SKU list. A credit value eligible for a prepaid customer may be the same or different from the credit value eligible for a postpaid customer. In some embodiments, the credit value is accompanied by an expiration date. In some embodiments, the marketing input system 305 includes an application for facilitating input of credit values and expiration dates by marketing personnel of the wireless service provider.

In one embodiment, the credit value is provided as a predetermined monetary value in a currency that may be used by a customer to purchase any service, or a limited number of services offered by the wireless service provider based upon preferences of the wireless service provider. The monetary-valued credit amount may be used towards the purchase of voice service, data service, messaging service, other services or goods, and the like, at prices established by the wireless service provider.

In another embodiment, the credit value is provided as a predetermined service value such as a number of voice or data minutes, a data transfer capacity (e.g., X bytes/Kbytes/Mbytes), a number of text or multimedia messages, mobile television service, mobile radio service, device insurance, and like services. A service value may include limited or unlimited use of one or more of these services for a specified period of time and be set to expire after the time period. For example, the service value may be designed such that a specified number of voice minutes are available to the customer for a period of no longer than a specified number of days.

In yet another embodiment, the credit value is provided as a predetermined value for a digital good, whereby the value may be redeemed by the customer to purchase or rent a digital good. A digital good may include, but is not limited to, digital audio media such as ringtones, musical scores, songs, audio books, lectures, podcasts, and the like; digital video media such as videos, video podcasts, movies, television show episodes, and the like; applications such as utility applications (e.g., anti-virus applications, disk maintenance applications, operating systems, etc.), productivity applications (e.g., web browsers, word processing applications, computer-aided drawing applications, photography applications, design applications, spreadsheet applications, presentation applications, financial applications, programming applications, etc.), and entertainment applications (e.g., streaming video applications, streaming audio applications, social networking applications, video games, etc.); and communication applications such as email client applications, instant messaging client applications, point-to-multipoint (broadcast/pseudo-broadcast) messaging applications (e.g., Twitter®, Google® Buzz, etc.), social networking applications (e.g., Facebook®, MySpace®, etc.), voice over Internet protocol (VoIP) applications, and the like. It is contemplated that digital goods may be provided as free-of-charge or relatively low cost demo versions to allow a customer to try, play, use, or otherwise interact with a portion or the entire digital good with or without time or play number restrictions.

During the credit value setup process, the DLC system 304 is also configured to create a list of IMEIs including all IMEIs in the SKU list. The IMEI list may be created periodically (e.g., hourly, daily, etc.) or upon request from the marketing input system 305. After the DLC system 304 creates the IMEI list, the DLC system 304 transmits the IMEI list to a credit eligibility database (CEDB) 306.

During a new account credit value activation process or an upgrade credit value activation process, the DLC system 304 is configured to provide information associated with a particular device/SIM package to an indefeasible bundle (IDB) system. This information may include the ICCID of the SIM, the credit value available for the SKU of the device/SIM package, and the expiration date, if applicable, of the credit value.

Credit Eligibility Database (CEDB)

In one embodiment, the CEDB 306 is a combination of hardware and software configured to determine credit eligibility of all IMEIs received in the IMEI list from the DLC system 304. During the credit value setup process, the CEDB 306 is configured to receive the IMEI list from the DLC system 304, analyze the list to determine which of the IMEIs are eligible for a credit, create a credit eligible IMEI list including all IMEIs that are determined to be eligible for a credit, and send the eligible IMEI list to an IDB system 308.

Indefeasible Bundle (IDB) System

In one embodiment, the IDB 308 is a combination of hardware and software configured to perform operations during a credit value setup process, a new account credit value activation process, and an upgrade credit value activation process, among other processes described herein.

During the credit value setup process, the IDB system 308 is configured to receive the eligible IMEI list from the CEDB 306, determine which IMEIs in the eligible IMEI list have already been given a credit, remove all IMEIs from the eligible IMEI list that have already received a credit, and create a clean IMEI list including only the IMEIs that are credit eligible and have not yet received a credit.

During the new account credit value activation and the upgrade credit value activation process, the IDB system 308 is configured to determine whether a credit value should be applied to a particular ICCID/IMEI pair and effect the application of the credit value, when appropriate.

Prepaid System

In one embodiment, a prepaid system 310 is a combination of hardware and software configured to perform operations related to the establishment of new customer account, management of existing customer accounts, and the application credit values to customer accounts per request by the IDB system 308. The prepaid system 310 performs these operations during the new account credit value activation and the upgrade credit value activation processes.

Activation Notice Queuing (ANQ) System

In one embodiment, an activation notice queuing (ANQ) system 312 is a combination of hardware and software configured to receive activation notices from the prepaid system 310 and store the activation notices in a queue for delivery to the IDB system 308. In one embodiment, the IDB system 308 subscribes to the ANQ system 312 queue such that activation notices are pushed to the IDB system 308 in an order set by the queue. In another embodiment, the IDB system 308 must request activation notices periodically from the ANQ system 312 via pull procedures. In another embodiment, the ANQ system 312 is implemented in the IDB system 308 or eliminated and all activation notices are sent directly to the IDB system 308. The ANQ system 312 is implemented in the illustrated embodiment to reduce processing burden on the IDB system 308.

Radio Access Network (RAM/Network Core

The systems network 300 also includes a RAN/network core 314. The RAN/network core 314 may be embodied as the GSM/UMTS RANs and the core network components illustrated in FIG. 1. Alternatively, the RAN/network core 314 may operate using any of the above-described telecommunications technologies. The RAN/network core 314 facilitates communications to/from the mobile device 200 to various components in the systems network 300 during the new account credit value activation and upgrade credit value activation processes.

IMEI Trigger System

The systems network 300 also includes an IMEI trigger system 316. In one embodiment, the IMEI trigger system 316 is a combination of hardware and software configured to receive a power-on transition event trigger from the mobile device 200 when a SIM is inserted into the mobile device 200 and the mobile device 200 is powered on for the first time. An exemplary trigger is a message including the IMEI of the mobile device 200, an IMSI, and an MSISDN. The IMEI trigger system 316 performs this operation during the new account credit value activation and the upgrade credit value activation processes. The IMEI trigger system 316 may provide incoming trigger messages to the IDB system 308 via push or pull procedures.

SIM Management System

In one embodiment, a SIM management system 318 is a combination of hardware and software configured to store a record of all SIMs by ICCID assigned to the wireless service provider. The SIM management system 318 is configured to provide the ICCID associated with any particular SIM and IMSI per request by the IDB system 308 during the new account credit value activation and the upgrade credit value activation processes.

Billing System

The systems network 300 also includes a billing system 320 that may be configured like the billing system 156 illustrated in FIG. 1. In one embodiment, the billing system 320 is a combination of hardware and software configured to store account information and to perform postpaid billing operations. During the new account credit value and upgrade credit value activation processes, the billing system 320 is configured to provide account type and/or account activation date information to the IDB system 308 upon request so that the IDB system 308 can determine whether the account is eligible to receive a service credit.

Short Messaging Service Center (SMSC) and Over-The-Air Gateway

The systems network 300 also includes a short messaging service center (SMSC) 322 for facilitating SMS service. The SMSC 322 is in communication with the IDB system 308 to receive credit notifications that are to be sent to the mobile device 200 to notify an associated customer that a credit has been applied to their account. The SMSC 322 is also in communication with an over-the-air (OTA) gateway 324. The OTA gateway 324 provides OTA functionality to the systems network 300 and facilitates the retrieval of information from the mobile device 200 in scenarios when a trigger is not received by the IDB system 308 for various reasons as described in detail herein below. The IDB system 308 may alternatively sends credit notifications to the OTA system 308 for delivery to the mobile device 200.

Customer Service System and IMEI Customer Service Application

The systems network 300 also includes a customer service system 326. In one embodiment, the customer service system 326 is a combination of hardware and software configured to provide customer service operations in the systems network 300. The customer service system 326 may be a call center or a standalone system. The call center may include one or more customer service representatives available via a telephone system to discuss customer service-related topics with customers having issues with their account or wireless service. The customer service system 326 may alternatively or additionally be configured to provide customer service via email, instant messaging, Internet chat, message forums, and/or interactive voice response (IVR). The customer service system 326 is configured to notify the IDB system 308 when a customer calls in or otherwise communicates to the customer service system 326 that they are entitled to a credit value (e.g., based on the customer's purchase of a SKU that includes a credit value), however, the credit value has not been applied to their account. The customer service system 326 includes an IMEI application 328 to facilitate IMEI lookup processes as described in greater detail herein below.

Figure 4:
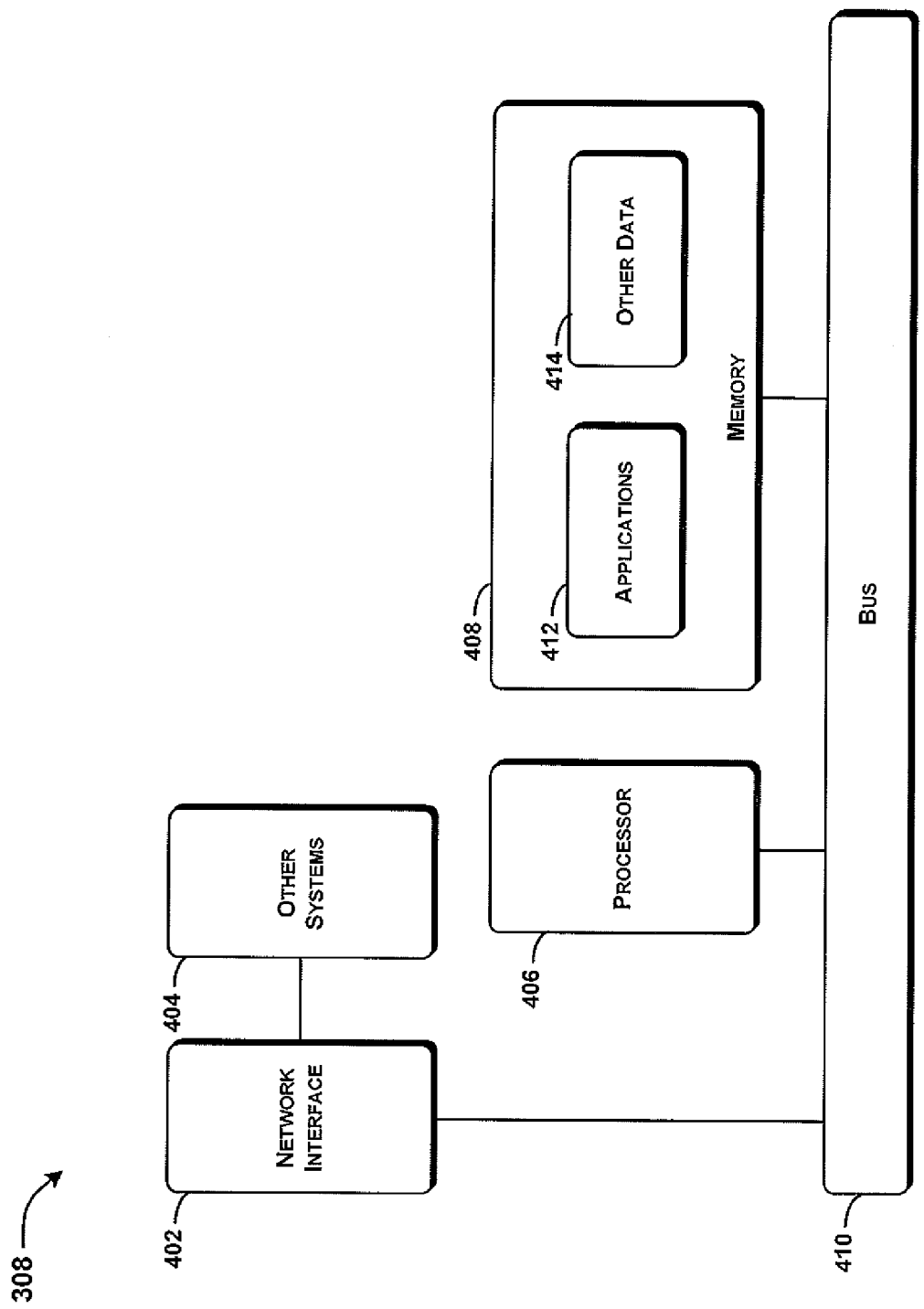
FIG. 4 schematically illustrates an exemplary indefeasible bundle (IDB) system and components thereof, according to an embodiment of the present disclosure.

Referring now to FIG. 4, an exemplary IDB system 308 and components thereof are illustrated, according to an embodiment of the present disclosure. Although connections are not shown between all components illustrated in FIG. 4, the components can interact with each other to carry out various system functions described herein. It should be understood that FIG. 4 and the following description are intended to provide a general description of a suitable environment in which the various aspects of some embodiments of the present disclosure can be implemented.

The IDB system 308 includes a network interface 402 for facilitating communications between the IDB system 308 and other systems 404, such as those illustrated in FIG. 3. The IDB system 308 also includes one or more processors 406 that are in communication with one or more memory modules 408 via one or more memory/data busses 410. The processor(s) 406 is configured to execute instructions, for example, one or more applications 412 stored on a tangible computer-readable medium, such as the memory module(s) 408, to perform actions described herein below with reference to FIGS. 5-9.

The term "memory," as used herein to describe the memory module(s) 408, collectively includes all memory types associated with the IDB system 308 such as, but not limited to, processor registers, processor cache, random access memory (RAM), other volatile memory forms, and non-volatile, semi-permanent or permanent memory types; for example, tape-based media, optical media, solid state media, hard disks, combinations thereof, and the like. While the memory module(s) 408 is illustrated as residing proximate the processor(s) 406, it should be understood that the memory module(s) 408 is in some embodiments a remotely accessible storage system. Moreover, the memory module(s) 408 is intended to encompass network memory and/or other storage devices in wired or wireless communication with the IDB system 308. The memory module(s) 408 may also store other data 414, which may include the clean IMEI list created by the IDB system 308, received trigger information, addresses for the other systems 404, and the like.

Setting Up a Service Credit

Figure 5:
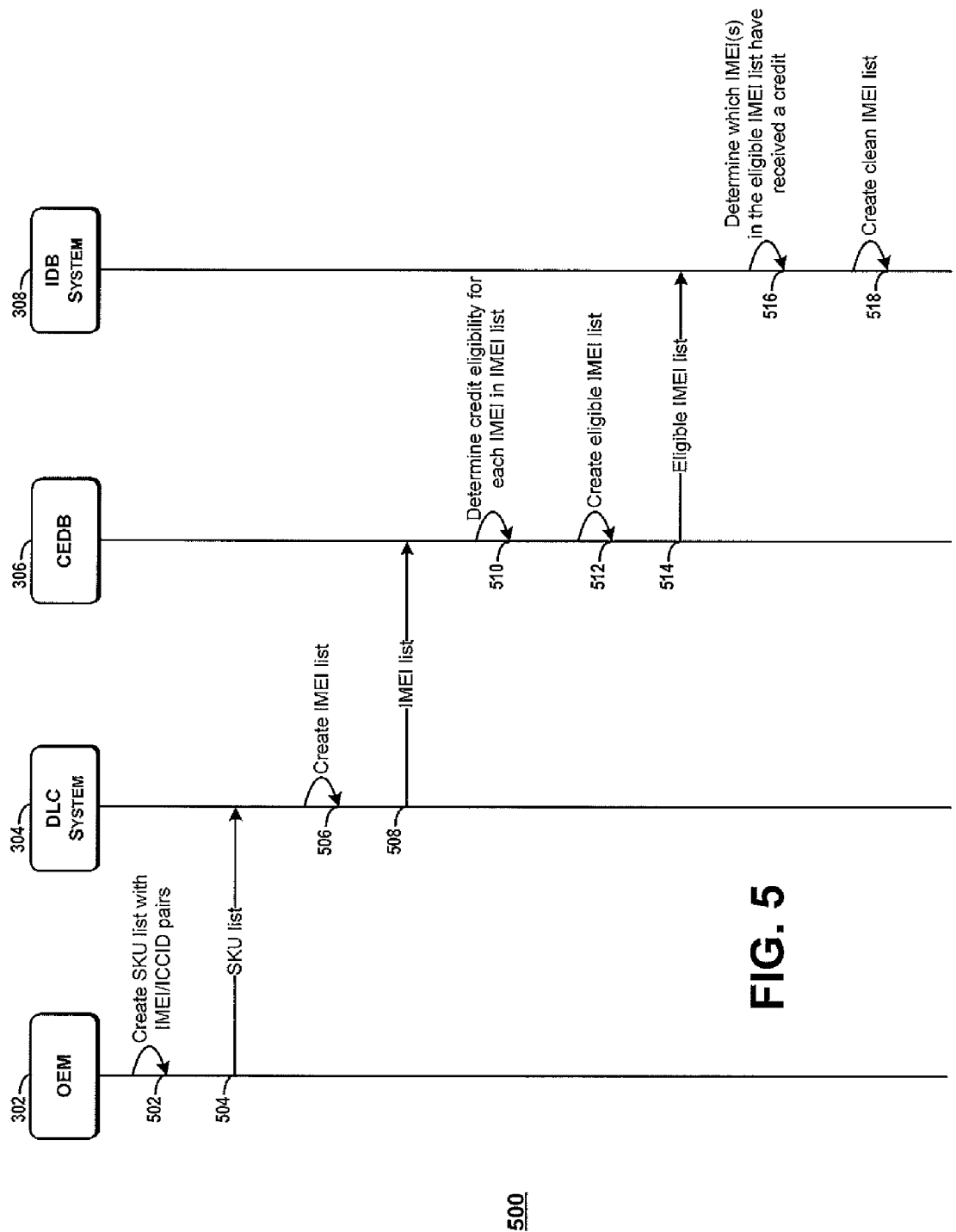
FIG. 5 schematically illustrates an exemplary message flow for setting up a service credit, according to an embodiment of the present disclosure.

Referring now to FIG. 5, an exemplary message flow 500 for setting up a service credit during a credit value setup process is illustrated, according to an embodiment of the present disclosure. The message flow begins at step 502 when the OEM 302 creates a list of SKUs assigned to device/SIM packages. Each SKU may be assigned to a device type/SIM type combination. Thus, a single SKU may be assigned to multiple particular device/SIM combinations, each including a different IMEI/ICCID combination.

A device type may include the device manufacturer, device model number, and, if applicable, any hardware, software, and/or firmware versions that may be used to distinguish between device types. A SIM type may include memory capacity, network compatibility, software versions, preloaded applications (e.g., IDB application, trigger application), and/or like information related to the SIM. For example, a first SIM type may be operational on both UMTS and GSM networks, whereas a second SIM type may only be operational on a GSM network. The wireless service provider may wish to distinguish between SIMs that are only capable of accessing a basic prepaid service that operates on a legacy GSM network versus a premium prepaid service that operates on a UMTS network to provide better voice quality and higher data rates to prepaid customers that opt to pay a premium for using a better network.

In one embodiment, the OEM 302 assigns a first SKU to a device type/SIM type combination that includes a device of type A, and a second SKU may be assigned to a device type/SIM type combination that includes a device of type B, and so on. Each particular device/SIM combination is associated with a different IMEI and ICCID, identifying each particular device and particular SIM, respectively. Thus, the SKU list includes each SKU number assigned to each device type/SIM type combination and the IMEI/ICCID pairs that are categorized under a particular SKU number.

The OEM 302 may assign different SKUs to the same device type/SIM type combination so that the wireless service provider can later assign different credit values to different SKUs containing the same type of physical components (i.e., device and SIM). The wireless service provider and the OEM 302 may make arrangements regarding the assignment of SKUs in a particular manner.

After the OEM 302 creates the SKU list containing all available SKUs and the IMEI/ICCID pairs for each particular device/SIM package within each SKU, the OEM 302 transmits the SKU list to the wireless service provider. In the illustrated embodiment, the OEM 302 transmits the SKU list to the DLC system 304 at step 504. In an alternative embodiment, the OEM 302 transmits the SKU list to another wireless service provider system such as, for example, a product intake system of a warehouse operated by or for the wireless service provider. In either case, the SKU list is then loaded into the DLC system 304. The DLC system 304 may then receive credit value and credit expiration information from the marketing input system 305 (not illustrated in FIG. 5), as described above with reference to FIG. 3.

At step 506, the DLC system 304 creates a list of all IMEIs included in the SKU list. The DLC system 304 then transmits the IMEI list to the CEDB 306 at step 508. At step 510, the CEDB 306 analyzes the IMEI list received from the DLC system 304 to determine credit eligibility for each IMEI in the IMEI list. At step 512, the CEDB 306 removes any IMEI in the IMEI list that is not eligible to receive a credit for any reason to create an IMEI list including only IMEIs that are presently eligible to receive a credit. At step 514, the CEDB 306 transmits the eligible IMEI list to the IDB system 308.

The DLC system 304, in another embodiment, also performs the operations described above for the CEDB 306. Accordingly, the CEDB 306 may be eliminated in this alternative embodiment.

At step 516, the IDB system 308 determines which, if any, of the IMEIs listed in the eligible IMEI list have received a credit. At step 518, the IDB system 308 creates a clean IMEI list including only IMEIs that are eligible for a credit but have not yet received a credit. The IDB system 308 uses the clean IMEI list to determine whether a credit should be applied to a given account associated with a particular IMEI, as described in detail herein below.

New Account Credit Activation

Figure 6:
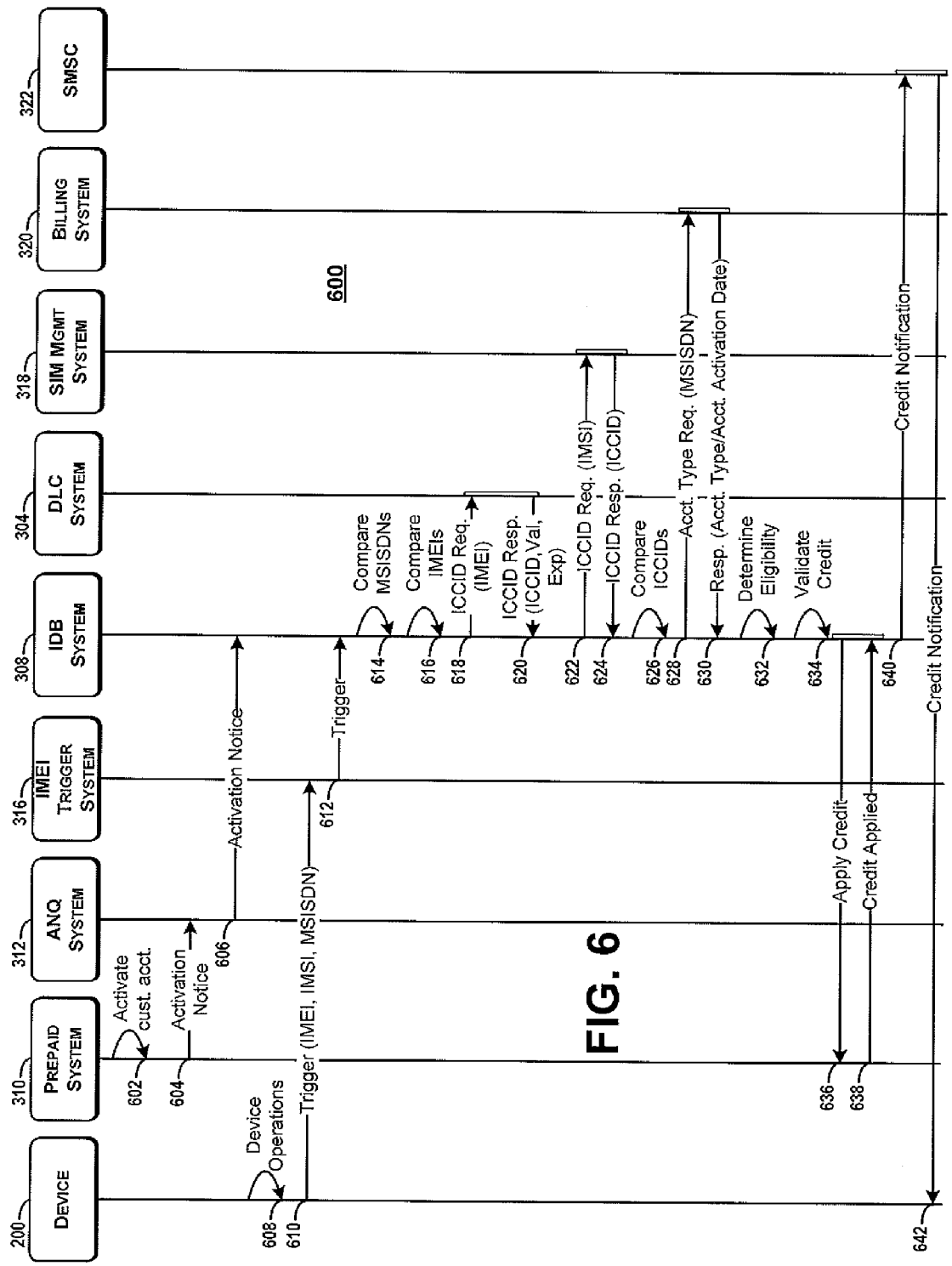
FIG. 6 schematically illustrates an exemplary message flow for applying an activation credit for a customer, according to an embodiment of the present disclosure.

Referring now to FIG. 6, an exemplary message flow 600 for applying an activation credit for a customer during a new account credit activation process is illustrated, according to an embodiment of the present disclosure. After a customer purchases a device/SIM package and the customer activates a new customer account through one of several account activation procedures. In one embodiment, the customer activates a new account with the help of a customer service representative at a retail outlet such as a store operated by or for the wireless service provider. In another embodiment, the customer activates a new account via a kiosk. In yet another embodiment, the customer activates a new account via a website. In another embodiment, the customer activates a new account via a customer service system (e.g., the customer service system 326) using an IVR system or a customer service representative. Specific account activation procedures are employed according to existing new account activation procedures.

At step 602, the prepaid system activates a new customer account for the customer that purchased the device/SIM package. At step 604, the prepaid system 310 generates and transmits an activation notice to the ANQ system 312. At step 606, the ANQ system 312 transmits the activation notice to the IDB system 308. In one embodiment, the IDB system 308 subscribes to an activation notice queue managed by the ANQ system 312 such that new activation notices are pushed to the IDB system 308 in order according to queues generated by the ANQ 312. Alternatively, the IDB system 308 may request pending activation notices periodically as needed.

At step 608, the SIM included in the device/SIM package is inserted in the mobile device 200 and the mobile device 200 is powered-on for the first time. This triggers the power-on event trigger application 234 to generate a trigger message including the IMEI of the mobile device 200, the IMSI stored in the SIM, and the MSISDN assigned to the customer's account during account activation. At step 610, the mobile device 200 transmits the trigger to the IMEI trigger system 316. At step 612, the IMEI trigger system 316 transmits the trigger to the IDB system 308.

In one embodiment, the IDB system 308 is configured with a timer that is initiated after the activation notice is received by the IDB system 308, at step 606. The timer functions to allow the IDB system 308 to retrieve necessary information via alternate means when a trigger is not received. In one exemplary case, the customer activates their account but fails to insert the SIM in the mobile device 200 and power-on the device for the first time. That is, the IDB system 308 is configured to, if the device operations (step 608) are not performed prior to expiration of the timer, acquire the trigger information via an alternate procedure described in detail herein below with reference to FIG. 8. Other cases in which a trigger is not received by the IDB system 308 are also described with reference to FIG. 8. The timer may be set to any value by the wireless service provider based upon circumstances of a given scenario. The wireless service provider may desire to adjust the timer to ensure an optimal balance between resource management and customer satisfaction. The remaining portion of the message flow 600 assumes that a trigger was successfully received by the IDB system 308, at step 612.

Figure 7:
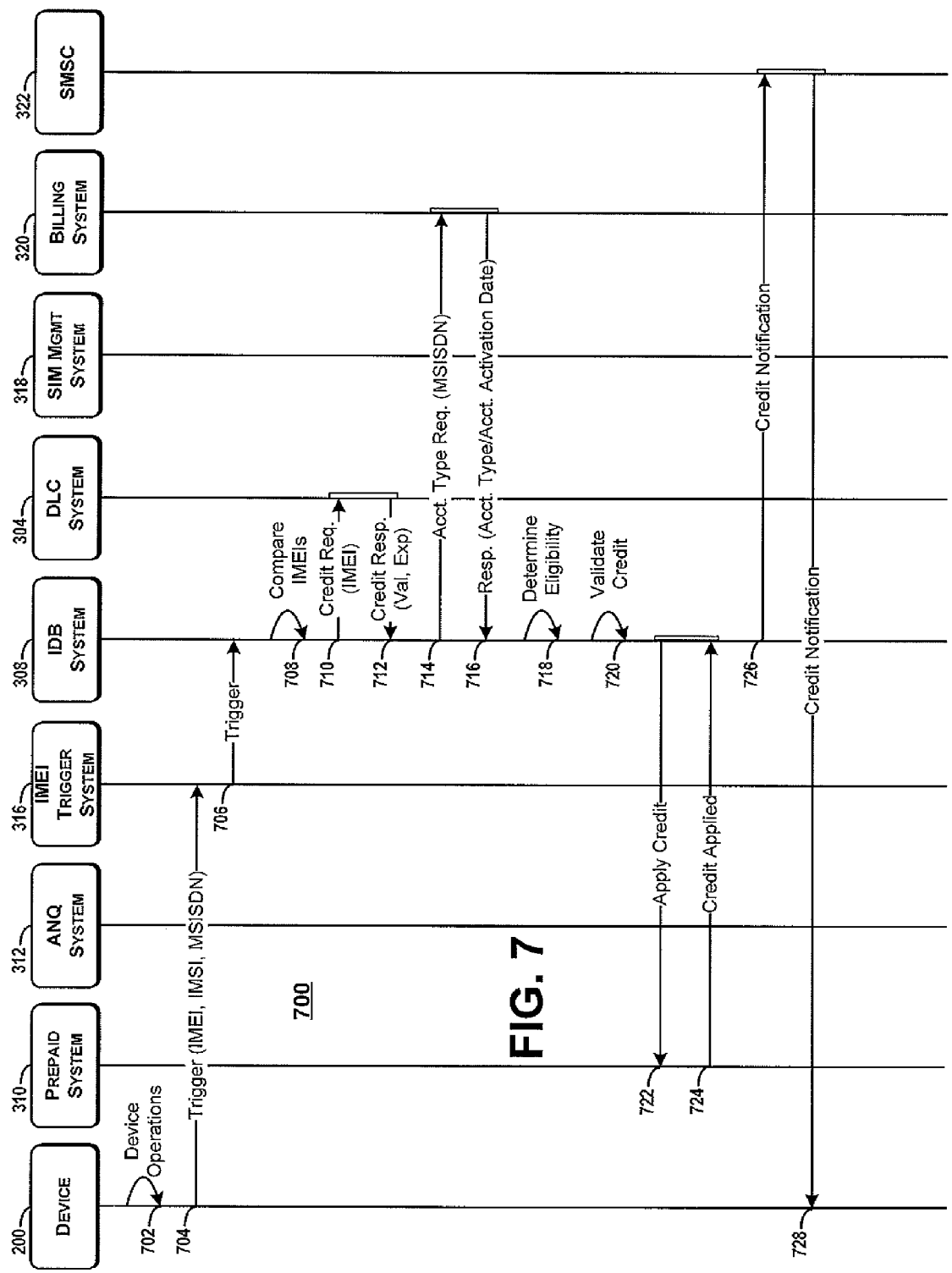
FIG. 7 schematically illustrates an exemplary message flow for applying an upgrade service credit for a customer, according to an embodiment of the present disclosure.

At step 614, the IDB system 308 compares the MSISDN received in the trigger to the MSISDN received in the activation notice. If the MSISDNs do not match, the IDB system 308 determines that the customer may be a potential upgrade customer. That is, the customer may have purchased the device/SIM package to use the device as an upgrade device and, as such, the customer is not using the included SIM for network access. FIG. 7 illustrates an exemplary procedure for handling upgrade service credits. If the MSISDNs match, as in the illustrated embodiment, the IDB system 308 determines that the customer is a new prepaid customer and the message flow 600 continues to step 616.

At step 616, the IDB system 308 compares the IMEI received in the trigger to the clean IMEI list established during the message flow 500 at step 518, as illustrated in FIG. 5. Based on this comparison the IDB system 308 is able to determine whether the mobile device 200 is eligible to receive a credit. If the IMEIs do not match, the IDB system 308 determines that the mobile device 200 has already received a credit and, as such, the IDB system 308 denies the request for credit. The IDB system 308 may then send a message to the SMSC 302 for delivery to the device associated with the MSISDN received in the trigger. The message may include a notification that the request for credit has been denied. If the credit is denied and the customer believes the denial is in error, the customer may call or otherwise establish communication with the customer service system 326 to resolve the issue. FIG. 9 illustrates an exemplary procedure for resolving customer issues when a credit should be applied but was not applied for one reason or another. If the IMEIs match, the IDB system 308 the message flow 600 continues to step 618.

At step 618, the IDB system 308 generates an ICCID request, including the IMEI received in the trigger as a parameter, and transmits the ICCID request to the DLC system 304. The DLC system 304 performs a look-up process using the IMEI as a query parameter to retrieve the ICCID, the credit value, and the credit value expiration date, if applicable, associated with the IMEI. At step 620, the DLC system 304 replies to the ICCID request with an ICCID response, including the ICCID, the credit value, and the credit value expiration date.

At step 622, the IDB system 308 generates a second ICCID request, including the IMEI received in the trigger as a parameter, and transmits the ICCID request to the SIM management system 318. The SIM management system 318 performs a look-up process using the IMSI as a query parameter to retrieve the ICCID associated with the IMSI. At step 624, the SIM management system 318 replies to the second ICCID request with a second ICCID response, including the ICCID.

At this point, the IDB system 308 has the ICCID and the IMEI as paired at the OEM 302 and the ICCID associated with the IMSI received in the trigger. At step 626, the IDB system 308 compares the ICCID received from the DLC system 304 to the ICCID received from the SIM management system 318. If the ICCIDs do not match, the IDB system 308 denies the request for credit. In one embodiment, the IDB system 308 sends a message to the SMSC 302 for delivery to the device associated with the MSISDN received in the trigger. The message may include a notification that the request for credit has been denied. If the credit is denied and the customer believes the denial is in error, the customer may call or otherwise establish communication with the customer service system 326 to resolve the issue. If the ICCIDs match, the message flow 600 continues to step 628.

At step 628, the IDB system 308 uses the MSISDN received in the trigger to retrieve an account type and/or an account activation date from the billing system 320. The IDB system 308 generates an account type request, including the MSISDN as a parameter, and transmits the account type request to the billing system 320. The billing system 320 performs a look-up process using the MSISDN as a query parameter to determine the account type and/or account activation date associated with the MSISDN. At step 630, the billing system 320 generates and transmits an account type response, including the requested account type and/or account activation date, to the IDB system 308.

The IDB system 308 includes configurable business rules to permit/deny credit eligibility. Generally, business rules are configurable to meet the needs of the wireless service provider. Exemplary business rules include account type-based rules and account tenure-based rules. Account type-based rules may include a list of all account types that are not eligible for a credit. Account types may be added or removed from the list as needed. Some account types that may be considered by a wireless service provider to be not eligible for a credit include, for example, business accounts, employee accounts, test accounts, and the like. Tenure-based rules are rules that enforce credit eligibility for existing customer accounts based upon the time a customer account has been active and/or the time since the customer account has been given a credit. For example, a wireless service provider may want to deny credit to customer accounts that have only been active a short time period, as determined by the wireless service provider. As another example, a wireless service provider may want to deny credit to customer accounts that have received a credit within a predetermined time period.

The IDB system 308 has determined that the device is eligible for a credit and now can determine if the customer account is eligible for a credit based upon whether the account type of the customer account is credit eligible as determined by the account type-based rules established in the IDB system 308. Accordingly, at step 632, the IDB system 308 determines credit eligibility of the customer account based upon the account type received from the billing system 320 at step 630. If the IDB system 308 determines that the customer account is not of an eligible account type, the IDB system 308 denies the request for credit. The IDB system 308 may then send a message to the SMSC 302 for delivery to the device associated with the MSISDN received in the trigger. Alternatively, the IDB system 308 may send the message to the OTA gateway 324 for delivery to the mobile device 200. The message may include a notification that the request for credit has been denied. If the credit is denied and the customer believes the denial is in error, the customer may call or otherwise establish communication with the customer service system 326 to resolve the issue. FIG. 9 illustrates an exemplary procedure for resolving customer issues when a credit should be applied but was not applied for one reason or another. If the IDB system 308 determines that the customer account is of an eligible account type, the message flow 600 proceeds to step 634.

At step 634, the IDB system 308 validates the credit against any tenure-based rules established in the IDB system 308. For example, the IDB system 308 uses the MSISDN to check whether the customer account was opened too recently to receive a credit based upon a tenure rule, and/or whether the customer account has received a credit within a predetermined time period defined for a tenure rule. By doing so, the IDB system 308 is able to deny credit to a customer that has simply changed account types to get the credit. If the IDB system 308 determines that the customer account is not eligible for a credit for tenure reasons, the IDB system 308 denies the request for credit. The IDB system 308 may then send a message to the SMSC 302 for delivery to the device associated with the MSISDN received in the trigger. The message may include a notification that the request for credit has been denied. If the credit is denied and the customer believes the denial is in error, the customer may call or otherwise establish communication with the customer service system 326 to resolve the issue. If the IDB system 308 determines that the customer account is still eligible for a credit, the message flow 600 proceeds to step 636.

At step 636, the IDB system 308 generates an apply credit request and transmits the apply credit request to the prepaid system. The apply credit request may include an account identifier (e.g., MSISDN), the credit value and, optionally, the credit value expiration date received from the DLC system 304. The prepaid system 310 receives the apply credit request and applies the credit value and optional credit value expiration date to the account identified by the account identifier. At step 638, the prepaid system 310 generates a credit applied notification and transmits the credit applied notification to the IDB system 308 to signify that the credit has been applied to the customer account.

At step 640, IDB system 308 generates a credit notification and transmits the credit notification to the SMSC 302. The SMSC 302 then forwards, at step 642, the credit notification to the mobile device 200 to notify the customer that the requested credit has been applied to their account. This signifies completion of the illustrated message flow 600.

Upgrade Credit Value Activation

Referring now to FIG. 7, an exemplary message flow 700 for applying an activation credit for a customer during an upgrade credit value activation process, according to an embodiment of the present disclosure. In an exemplary use case, the customer purchases a new device/SIM package with the intention on using the new device as an upgrade to their old device. If the customer inserts the new SIM into the new device, the new SIM will be paired to the new device thereby preventing the customer from using their old SIM that may be associated with an existing prepaid account that may have a credit balance. Thus, it is contemplated that the wireless service provider, the OEM 302, or a third party mark the new device/SIM package so as to convey to the customer that the new SIM should not be inserted into the new device if the customer intends the new device to be an upgrade to their old device. The illustrated message flow 700 provides a procedure for the customer to receive the credit value associated with a particular device/SIM package while maintaining their old account information including any existing credit balance.

The message flow 700 begins at step 702, wherein the customer, for example, inserts their old SIM into the new mobile device 200 included in the device/SIM package and powers on the mobile device 200 for the first time. This triggers the power-on event trigger application 234 to generate a trigger including the IMEI of the mobile device 200, the IMSI stored in the SIM, and the MSISDN. At step 704, the mobile device 200 transmits the trigger to the IMEI trigger system 316. At step 706, the IMEI trigger system 316 transmits the trigger to the IDB system 308.

At step 708, the IDB system 308 compares the IMEI received in the trigger to the clean IMEI list established during the message flow 500 at step 518, as illustrated in FIG. 5. Based upon this comparison, the IDB system 308 is able to determine whether the mobile device 200 is eligible to receive a credit. If the IMEIs do not match, the IDB system 308 determines that the mobile device 200 has already received a credit and, as such, the IDB system 308 denies the request for credit. The IDB system 308 may then send a message to the SMSC 302 for delivery to the device associated with the MSISDN received in the trigger. The message may include a notification that the request for credit has been denied. If the credit is denied and the customer believes the denial is in error, the customer may call or otherwise establish communication with the customer service system 326 to resolve the issue. FIG. 9 illustrates an exemplary procedure for resolving customer issues when a credit should be applied but was not applied for one reason or another. If the IMEIs match, the IDB system 308 the message flow 700 continues to step 710.

At step 710, the IDB system 308 generates a credit request, including the IMEI received in the trigger as a parameter, and transmits the ICCID request to the DLC system 304. The DLC system 304 performs a look-up process using the IMEI as a query parameter to retrieve the credit value and, optionally, the credit value expiration date that are each associated with the IMEI. At step 712, the DLC system 304 replies to the credit request with a credit response, including the credit value and, optionally, the credit value expiration date. The upgrade credit value activation process does not enforce ICCID matching because the ICCID of the customer's old SIM is not the same as the ICCID included in the device/SIM package. Thus, the IDB system 308 need only determine whether the IMEI of the new mobile device is credit eligible.

After the IDB system 308 receives the credit value and the optional credit value expiration date from the DLC system 304, the message flow 700 proceeds to step 714, wherein the IDB system 308 uses the MSISDN received in the trigger to retrieve an account type and/or an account activation date from the billing system 320. The IDB system 308 generates an account type request, including the MSISDN as a parameter, and transmits the account type request to the billing system 320. The billing system 320 performs a look-up process using the MSISDN as a query parameter to determine the account type and/or account activation date associated with the MSISDN. At step 716, the billing system 320 generates and transmits an account type response, including the requested account type and/or account activation date, to the IDB system 308.

The IDB system 308 includes configurable business rules to permit/deny credit eligibility. As described above, the business rules are configurable to meet the needs of the wireless service provider. Exemplary business rules include account type-based rules and account tenure-based rules. Account type-based rules may include a list of all account types that are not eligible for a credit. Account types may be added or removed from the list as needed. Some account types that may be considered by a wireless service provider to be not eligible for a credit include, for example, business accounts, employee accounts, test accounts, and the like. Tenure-based rules are rules that enforce credit eligibility for existing customer accounts based upon the time a customer account has been active and/or the time since the customer account has been given a credit. For example, a wireless service provider may want to deny credit to customer accounts that have only been open a short time period. As another example, a wireless service provider may want to deny credit to customer accounts that have received a credit within a predetermined time period.

The IDB system 308 has determined that the device is eligible for a credit and now can determine if the customer account is eligible for a credit based upon whether the account type of the customer account is credit eligible as determined by the account type-based rules established in the IDB system 308. Accordingly, at step 718, the IDB system 308 determines credit eligibility of the customer account based upon the account type received from the billing system 320. If the IDB system 308 determines that the customer account is not of an eligible account type, the IDB system 308 denies the request for credit. The IDB system 308 may then send a message to the SMSC 302 for delivery to the device associated with the MSISDN received in the trigger. The message may include a notification that the request for credit has been denied. If the credit is denied and the customer believes the denial is in error, the customer may call or otherwise establish communication with the customer service system 326 to resolve the issue. If the IDB system 308 determines that the customer account is of an eligible account type, the message flow 700 proceeds to step 720.

At step 720, the IDB system 308 validates the credit against any tenure-based rules established in the IDB system 308. For example, the IDB system 308 uses the MSISDN to check whether the customer account was opened too recently to receive a credit based upon a tenure rule, and/or whether the customer account has received a credit within a predetermined time period defined for a tenure rule. By doing so, the IDB system 308 is able to deny credit to a customer that has simply changed account types to get the credit. If the IDB system 308 determines that the customer account is not eligible for a credit for tenure reasons, the IDB system 308 denies the request for credit. The IDB system 308 may then send a message to the SMSC 302 for delivery to the device associated with the MSISDN received in the trigger. The message may include a notification that the request for credit has been denied. If the credit is denied and the customer believes the denial is in error, the customer may call or otherwise establish communication with the customer service system 326 to resolve the issue. If the IDB system 308 determines that the customer account is still eligible for a credit, the message flow 700 proceeds to step 722.

At step 722, the IDB system 308 generates an apply credit request and transmits the apply credit request to the prepaid system 310. The apply credit request may include an account identifier (e.g., MSISDN), the credit value and, optionally, the credit value expiration date received from the DLC system 304. The prepaid system 310 receives the apply credit request and applies the credit value and optional credit value expiration date to the account identified by the account identifier. At step 724, the prepaid system 310 generates a credit applied notification and transmits the credit applied notification to the IDB system 308 to signify that the credit has been applied to the customer account.

At step 726, IDB system 308 generates a credit notification and transmits the credit notification to the SMSC 302. The SMSC 302 then forwards, at step 728, the credit notification to the mobile device 200 to notify the customer that the requested credit has been applied to their account. This signifies completion of the illustrated message flow 700.

Setting Up a Service Credit without a Trigger

Referring now to FIG. 8, an exemplary message flow 800 for setting up a service credit without receiving a trigger at the IDB system 308 is illustrated, according to an embodiment of the present disclosure. The IDB system 308 may not receive a trigger for various reasons. In one such case, the power-on event trigger application 234 in the SIM may have failed to load or otherwise failed (e.g., due to error, low device battery level, or otherwise) to generate the trigger upon the mobile device 200 being powered-on. In another case, the customer may not have powered-on the mobile device 200 as is required to send the trigger. In another case, the device power-on event trigger application 234 operates correctly, however, for one reason or another, communication between the mobile device 200 and the IMEI trigger system 316 is interrupted, thus preventing the mobile device 200 from sending the trigger to the IMEI trigger system 315. In yet another case, the IMEI trigger system 316 receives the trigger from the mobile device 200 (e.g., the embodiment illustrated in FIG. 6), however, the IMEI trigger system 316 fails to send the IMEI trigger to the IDB system 308 due to error, time-out, or otherwise. In still another case, communication between the IMEI trigger system 316 and the IDB system 308 is interrupted, thus preventing the IMEI trigger system 316 from sending the trigger to the IDB system 308. The IDB system 308 may not receive a trigger for reasons other than those described above. The message flow 800 provides a process utilizing OTA procedures to acquire information needed to process a requested credit.

A customer purchases a device/SIM package and the customer activates a new customer account through one of several account activation procedures at step 802, such as those described above. For example, in one embodiment, the customer activates a new account with the help of a customer service representative at a retail outlet, such as a wireless service provider's retail location. In another embodiment, the customer activates a new account via a kiosk. In yet another embodiment, the customer activates a new account via a website. In another embodiment, the customer activates a new account via a customer service system (e.g., the customer service system 326) using an IVR system or a customer service representative. Specific account activation procedures are employed according to existing new account activation procedures, At step 804, the prepaid system 310 generates and transmits an activation notice to the ANQ system 312. At step 806, the ANQ system 312 transmits the activation notice to the IDB system 308. The IDB system 308 may subscribe to an activation notice queue managed by the ANQ system 312 such that new activation notices are pushed to the IDB system 308. Alternatively, the IDB system 308 may request pending activation notices periodically upon request.

As described above with reference to FIG. 6, the IDB system 308 may be configured with a timer that is initiated after the activation notice is received by the IDB system 308. The timer may be set to any value by the wireless service provider based upon circumstances of a given scenario. The wireless service provider may desire to adjust the timer to ensure an optimal balance between resource management and customer satisfaction. The remaining portion of the message flow 800 assumes that a trigger was not received by the IDB system 308.

The IDB 308 generates an IMSI request, including the MSISDN received in the activation notice as a parameter. At step 808, the IDB 308 transmits the IMSI request to the billing system 320. The billing system 320 performs a look-up process to find the IMSI associated with the MSISDN. The billing system 320 generates an IMSI response, including the IMSI associated with the MSISDN. At step 810, the billing system 320 transmits the IMSI response to the IDB 308.

At step 812, the IDB system 308 generates an ICCID request, including the IMEI received in the trigger as a parameter. The IDB system 308 then transmits the ICCID request to the SIM management system 318. The SIM management system 318 performs a look-up process using the IMSI as a query parameter to retrieve the ICCID associated with the IMSI. At step 814, the SIM management system 318 replies to the ICCID request with an ICCID response, including the ICCID.

At step 816, the IDB system 308 generates an OTA request, including the ICCID as a parameter. The IDB system 308 then transmits the OTA request to the OTA gateway 324. The OTA gateway 324 formats the OTA request as an SMS message, including the ICCID as a parameter to request the IMEI of the mobile device 200. At step 818, the OTA gateway 324 transmits the IMEI request formatted as an SMS message to the SMSC 322. At step 820, the SMSC 322 forwards the IMEI request to the mobile device 200. If the mobile device 200 is not powered on, the message flow 800 ends. Otherwise, the mobile device 200 retrieves its IMEI from the memory 208 or the SIM memory 231. The mobile device 200 generates an IMEI response, including the IMEI. At step 822, the mobile device 200 transmits the IMEI response, including the IMEI to the SMSC 322. At step 824, the SMSC 322 forwards the IMEI response to the OTA gateway 324, which, in turn at step 826, forwards the IMEI response to the IDB system 308.

At step 828, the IDB system 308 compares the IMEI received through the OTA procedure to the clean IMEI list established during the message flow 500 at step 518, as illustrated in FIG. 5. Based on this comparison the IDB system 308 is able to determine whether the mobile device 200 is eligible to receive a credit. If the IMEIs do not match, the IDB system 308 determines that the mobile device 200 has already received a credit and, as such, the IDB system 308 denies the request for credit. The IDB system 308 may then send a message to the SMSC 302 for delivery to the device associated with the MSISDN received in the trigger. The message may include a notification that the request for credit has been denied. If the credit is denied and the customer believes the denial is in error, the customer may call or otherwise establish communication with the customer service system 326 to resolve the issue. If the IMEIs match, the message flow 800 continues to step 830.

At step 830, the IDB system 308 generates a credit request, including the IMEI received from the mobile device 200 during the OTA procedure as a parameter, and transmits the credit request to the DLC system 304. The DLC system 304 performs a look-up process using the IMEI as a query parameter to retrieve the credit value and, optionally, the credit value expiration date that are each associated with the IMEI. At step 832, the DLC system 304 replies to the credit request with a credit response, including the credit value and, optionally, the credit value expiration date.

After the IDB system 308 receives the credit value and the optional credit value expiration date from the DLC system 304, the message flow 800 proceeds to step 834, wherein the IDB system 308 uses the MSISDN received in the activation notice to retrieve an account type and/or an account activation date from the billing system 320. The IDB system 308 generates an account type request, including the MSISDN as a parameter, and transmits the account type request to the billing system 320. The billing system performs a look-up process using the MSISDN as a query parameter to determine the account type and/or account activation date associated with the MSISDN. At step 836, the billing system 320 generates and transmits an account type response, including the requested account type and/or account activation date, to the IDB system 308.

The IDB system 308 includes configurable business rules to permit/deny credit eligibility. As described above, the business rules are configurable to meet the needs of the wireless service provider. Exemplary business rules include account type-based rules and account tenure-based rules. Account type-based rules may include a list of all account types that are not eligible for a credit. Account types may be added or removed from the list as needed. Some account types that may be considered by a wireless service provider to be not eligible for a credit include, for example, business accounts, employee accounts, test accounts, and the like. Tenure-based rules are rules that enforce credit eligibility for existing customer accounts based upon the time a customer account has been active and/or the time since the customer account has been given a credit. For example, a wireless service provider may want to deny credit to customer accounts that have only been active a short time period. As another example, a wireless service provider may want to deny credit to customer accounts that have received a credit within a predetermined time period.

The IDB system 308 has determined that the device is eligible for a credit and now can determine if the customer account is eligible for a credit based upon whether the account type of the customer account is credit eligible as determined by the account type-based rules established in the IDB system 308. Accordingly, at step 838, the IDB system 308 determines credit eligibility of the customer account based upon the account type received from the billing system 320. If the IDB system 308 determines that the customer account is not of an eligible account type, the IDB system 308 denies the request for credit. The IDB system 308 may then send a message to the SMSC 302 for delivery to the mobile device 200 associated with the MSISDN received in the trigger. The message may include a notification that the request for credit has been denied. If the credit is denied and the customer believes the denial is in error, the customer may call or otherwise establish communication with the customer service system 326 to resolve the issue. If the IDB system 308 determines that the customer account is of an eligible account type, the message flow 800 proceeds to step 840.

At step 840, the IDB system 308 validates the credit against any tenure-based rules established in the IDB system 308. For example, the IDB system 308 uses the MSISDN to check whether the customer account was opened too recently to receive a credit based upon a tenure rule, and/or whether the customer account has received a credit within a predetermined time period defined for a tenure rule. By doing so, the IDB system 308 denies credit to a customer that has simply changed account types to get the credit. If the IDB system 308 determines that the customer account is not eligible for a credit for tenure reasons, the IDB system 308 denies the request for credit. In one embodiment, the IDB system 308 sends a message to the SMSC 302 for delivery to the device associated with the MSISDN received in the trigger. The message includes a notification that the request for credit has been denied. If the credit is denied and the customer believes the denial is in error, the customer may call or otherwise establish communication with the customer service system 326 to resolve the issue. If the IDB system 308 determines that the customer account is still eligible for a credit, the message flow 800 proceeds to step 842.

At step 842, the IDB system 308 generates an apply credit request and transmits the apply credit request to the prepaid system 310. The apply credit request may include an account identifier (e.g., MSISDN), the credit value and, optionally, the credit value expiration date received from the DLC system 304. The prepaid system 310 receives the apply credit request and applies the credit value and optional credit value expiration date to the account identified by the account identifier. At step 844, the prepaid system 310 generates a credit applied notification and transmits the credit applied notification to the IDB system 308 to signify that the credit has been applied to the customer account.

At step 846, IDB system 308 generates a credit notification and transmits the credit notification to the SMSC 302. The SMSC 302 then forwards, at step 848, the credit notification to the mobile device 200 to notify the customer that the requested credit has been applied to their account. The message flow 800 ends.

Credit Resubmission

Referring now to FIG. 9, an exemplary message flow 900 for handling customer requests for credit resubmission is illustrated, according to an exemplary embodiment of the present disclosure. The message flow 900 begins and, at step 902, the IDB system 308 fails to apply a credit to a customer's account. At step 904, the IDB system 308 generates and transmits a credit failure notification to the customer service system 326. At step 906, the customer service system 326 creates a customer service ticket for the failed credit. In an alternative embodiment, the IDB system 308 does not provide a credit failure notification to the customer service system 326 and the customer service system does not create the ticket.

At step 908, a customer calls-in or otherwise establishes communication with the customer service system 326. The customer service system 326 may be configured to serve incoming communications via any of a variety of methods including, for example, calls, instant messaging, email, IVR, message forums, and the like.

In the illustrated embodiment, the customer calls-in to the customer service system 326. At step 910, a customer service representative requests, via telephone, messaging, or otherwise, and receives the IMEI of the customer's new device. Alternatively, if an IVR is used, the IVR prompts the customer to entire the IMEI. At step 912, the customer service system 326 transmits a credit eligibility request to the IDB system 308. The credit eligibility request includes the IMEI received from the customer.

At step 914, the IDB system 308 compares the IMEI received from the customer to the clean IMEI list established during the message flow 500 at step 518, as illustrated in FIG. 5. Based on this comparison the IDB system 308 is able to determine whether the customer's device is eligible to receive a credit.

At step 916, the IDB system 308 returns a credit eligibility response to the customer service system 326. The credit eligibility response includes an indication of the credit eligibility of the IMEI. If the IDB system 308 determines that the IMEI received from the customer does not match an IMEI included in the clean IMEI list, the IDB system 308 generates the credit eligibility response, including an indication that the IMEI is not credit eligible. The IDB system 308 may also include a reason why the IMEI is not credit eligible. If the IDB system 308 determines that the IMEI received from the customer matches an IMEI included in the clean IMEI list, the IDB system 308 generates the credit eligibility response, including an indication that the IMEI is credit eligible.

The customer service system 326 receives the credit eligibility response from the IDB system 308 and notifies the customer of whether the IMEI is eligible for credit. If the IMEI is not eligible for credit, the customer service representative, or alternatively the IVR, notifies the customer that the IMEI is not eligible for credit and the message flow 900 ends. If the IMEI is eligible for credit, the customer service representative, or alternatively the IVR, notifies the customer that the IMEI is eligible and requests the customer's MSISDN. At step 918, the customer service system 326 receives the MSISDN. At step 920, the customer service system 326 transmits the MSISDN to the IDB system 308. At step 922, the IDB system 308 uses the MSISDN to enter the OTA message flow, as illustrated and described above with reference to FIG. 8 using the MSISDN received from the customer instead of the MSISDN received in the activation notice as illustrated in FIG. 8. The IDB system 308 processes the credit per the processes described above and sends the device a notification that the credit has been applied.

The disclosed embodiments are merely examples that may be embodied in various and alternative forms, and combinations thereof. As used herein, for example, "exemplary," and similar terms, refer expansively to embodiments that serve as an illustration, specimen, model or pattern. The figures are not necessarily to scale and some features may be exaggerated or minimized, such as to show details of particular components. In some instances, well-known components, systems, materials or methods have not been described in detail in order to avoid obscuring the systems, methods, and computer program products of the present disclosure. Therefore, specific structural and functional details disclosed herein are not to be interpreted as limiting, but merely as a basis for the claims and as a representative basis for teaching one skilled in the art.

The law does not require and it is economically prohibitive to illustrate and teach every possible embodiment of the present claims. Hence, the above-described embodiments are merely exemplary illustrations of implementations set forth for a clear understanding of the principles of the disclosure. Variations, modifications, and combinations may be made to the above-described embodiments without departing from the scope of the claims. All such variations, modifications, and combinations are included herein by the scope of this disclosure and the following claims.

What is claimed is:

1. A method, for selectively applying a service credit to a new customer account, comprising:
  receiving, by a first system comprising a processor, in response to the new customer account being activated at a prepaid system, an activation notice comprising a first mobile subscriber number;
  receiving, by the first system, from a device associated with the new customer account, a trigger message comprising an international mobile equipment identity of the device, an international mobile subscriber identity stored in a subscriber identity module installed in the device, and a second mobile subscriber number;
  denying, if the first mobile subscriber number and the second mobile subscriber number do not match, application of the service credit; and
  performing, if the first mobile, subscriber number and the second mobile subscriber number match, additional operations comprising:
    denying, if the international mobile equipment identity received in the trigger message does not match one of a plurality of international mobile equipment identities listed in
  an international mobile equipment identity list, application of the service credit; and
    performing, if the international mobile equipment identity received in the trigger message matches one of the plurality of international mobile equipment identities, further operations comprising:
      generating and transmitting, to a device lifecycle system, a first integrated circuit card identifier request comprising the international mobile equipment identity as a query parameter;
      receiving a first integrated circuit card identifier response comprising a first integrated circuit card identifier associated with the international mobile equipment identity and a credit value available for the international mobile equipment identity;
      generating and transmitting, to a subscriber identity module, a second integrated circuit card identifier request comprising the international mobile subscriber identity as a query parameter;

receiving a second integrated circuit card identifier response comprising a second integrated circuit card identifier associated with the international mobile subscriber identity;

denying, if the first integrated circuit card identifier and the second integrated circuit card identifier do not match, application of the service credit; and performing, if the first integrated circuit card identifier and the second integrated circuit card identifier match, still further operations comprising:

generating and transmitting, to the prepaid system, an apply service credit request and comprising the credit value; and receiving, from the prepaid system, an apply service credit response comprising a notification that the credit value of the service credit has been applied to the new customer account.

2. The method of claim 1, wherein receiving the activation notice comprises receiving the activation notice from an activation notice queuing system configured to receive a plurality of activation notices from the prepaid system as accounts are activated and send the activation notices to the first system based upon an order of each activation notice of the plurality of activation notices established in an activation notice queue.

3. The method of claim 1, wherein receiving the trigger message from the device comprises receiving, from a power-on event trigger application stored on the subscriber identity module, the trigger message in response to the device being powered-on for the first time with the subscriber identity module installed.

4. The method of claim 1, further comprising generating the international mobile equipment identity list prior to the device being offered for sale.

5. The method of claim 1, wherein generating the international mobile equipment identity list is based upon a determination of which international mobile equipment identities in a credit eligible international mobile equipment identity list have received a credit.

6. The method of claim 5, wherein the international mobile equipment identities in the credit eligible international mobile equipment identity list are each paired with a particular integrated circuit card identifier of a particular subscriber identity module that is packaged together with a particular device associated with each international mobile equipment identity in the credit eligible list.

7. The method of claim 1, wherein performing the still further operations comprises, prior to generating the apply service credit request:

generating and transmitting, to a billing system, an account information request comprising the first mobile subscriber number;

receiving an account information response comprising account information associated with the first mobile subscriber number; and determining, using the account information, and based upon a business rule, whether to permit or deny application of the service credit, wherein the business rule comprise at least one type of rule selected from a group consisting of:

an account type-based rule employing one or both of a list of all account types that are not eligible for service credit and a list of all account types that are eligible for service credit; and a tenure-based rule used to enforce credit eligibility for customer accounts based upon at least one time factor selected from a group of time factors consisting of a time since a particular customer account was activated and a time since a particular customer account was given service credit.

8. The method of claim 7, further comprising sending, to the device, a credit notification indicating that the service credit has been applied to the new customer account.

9. A system, for selectively applying a service credit to a new customer account, comprising:

a processor;

a memory being in communication with the processor and having stored thereon computer-executable instructions that, when executed by the processor, cause the processor to perform operations comprising:

receiving, in response to the new customer account being activated at a prepaid system, an activation notice comprising a first mobile subscriber number;

receiving, from a device associated with the new customer account, a trigger message comprising an international mobile equipment identity of the device, an international mobile subscriber identity stored in a subscriber identity module installed in the device, and a second mobile subscriber number;

denying, if the first mobile subscriber number and the second mobile subscriber number do not match, deny application of the service credit; and performing, if the first mobile subscriber number and the second mobile subscriber number match, additional operations comprising:

denying, if the international mobile equipment identity received in the trigger message does not match one of a plurality of international mobile equipment identities listed in an international mobile equipment identity list, application of the service credit; and performing, if the international mobile equipment identity received in the trigger message matches one of the plurality of international mobile equipment identities, further operations comprising:

generating and transmitting, to a device lifecycle system, a first integrated circuit card identifier request comprising the international mobile equipment identity as a query parameter;

receiving receive, a first integrated circuit card identifier response comprising the first integrated circuit card identifier associated with the international mobile equipment identity and the credit value available for the international mobile equipment identity;

generating and transmitting, to a subscriber identity module management system, a second integrated circuit card identifier request comprising the international mobile subscriber identity as a query parameter;

receiving, a second integrated circuit card identifier response comprising the second integrated circuit card identifier associated with the international mobile subscriber identity;

denying, if the first integrated circuit card identifier and the second integrated circuit card identifier do not match, application of the service credit; and performing, if the first integrated circuit card identifier and the second integrated circuit card identifier match, still further operations comprising:

generating and transmitting, to the prepaid system, an apply service credit request comprising the credit value; and receiving, from the prepaid system, an apply service credit response comprising a notification that the credit value of the service credit has been applied to the new customer account.

10. The system of claim 9, wherein the computer-executable instructions that, when executed by the processor, cause the processor to receive the activation notice, cause the processor to receive the activation notice from an activation notice queuing system configured to receive a plurality of activation notices from the prepaid system as accounts are activated and send the activation notices to the system based upon an order of each activation notice of the plurality of activation notices established in an activation notice queue.

11. The system of claim 9, wherein the computer-executable instructions that, when executed by the processor, cause the processor to receive the trigger message from the device, cause the processor to receive, from a power-on event trigger application stored on the subscriber identity module, the trigger in response to the device being powered-on for the first time with the subscriber identity module installed.

12. The system of claim 9, wherein the computer-executable instructions, when executed by the processor, cause the processor to generate the international mobile equipment identity list prior to the device being offered for sale.

13. The system of claim 9, wherein the computer-executable instructions that, when executed by the processor, cause the processor to generate the international mobile equipment identity list, cause the processor to generate the list based upon a determination of which international mobile equipment identities in a credit eligible international mobile equipment identity list have received a credit.

14. The system of claim 13, wherein the international mobile equipment identities in the credit eligible international mobile equipment identity list are each paired with a particular integrated circuit card identifier of a particular subscriber identity module that is packaged together with a particular device associated with each international mobile equipment identity in the credit eligible list.

15. The system of claim 9, wherein the computer-executable instructions that, when executed by the processor, cause the processor to perform the still further operations, cause the processor to, prior to generating the apply service credit request:
  generate and transmit, to a billing system, an account information request comprising the first mobile subscriber number as a query parameter;
  receive an account information response comprising the account information associated with the first mobile subscriber number; and
  determine, using use the account information, based upon a business rule, whether to permit or deny application of the service credit, wherein the business rule rules comprise at least one type of rule selected from a group consisting of:
    an account type-based rule employing one or both of a list of all account types that are not eligible for service credit and a list of all account types that are eligible for service credit; and
    a tenure-based rule used to enforce credit eligibility for customer accounts based upon at least one time factor selected from a group consisting of a time since a particular customer account was first activated and a time since a particular customer account was given service credit.

16. The system of claim 9, wherein the computer-executable instructions that, when executed by the processor, cause the processor to send, to the device, a credit notification indicating that the service credit has been applied to the new customer account.

17. A computer-readable storage medium having stored thereon computer-executable instructions that, when executed by a processor, cause the processor to perform operations, for selectively applying a service credit to a new customer account, comprising:
  receiving, in response to the new customer account being activated at a prepaid system, an activation notice comprising a first mobile subscriber number;
  receiving, message from a device associated with the new customer account, a trigger message comprising an international mobile equipment identity of the device, an international mobile subscriber identity stored in a subscriber identity module installed in the device, and a second mobile subscriber number;
  denying, if the first mobile subscriber number and the second mobile subscriber number do not match, application of the service credit; and
  performing, if the first mobile subscriber number and the second mobile subscriber number match, additional operations comprising:
    denying, if the international mobile equipment identity received in the trigger message does not match one of the plurality of international mobile equipment identities in an international mobile equipment identity list, application of the service credit; and
    performing, if the international mobile equipment identity received in the trigger message matches one of the plurality of international mobile equipment identities in the international mobile equipment identity list, further operations comprising:
      generating and transmitting, to a device lifecycle system, a first integrated circuit card identifier request comprising the international mobile equipment identity as a query parameter;
      receiving a first integrated circuit card identifier response comprising the first integrated circuit card identifier associated with the international mobile equipment identity and the credit value available for the international mobile equipment identity;
      generating and transmitting, to a subscriber identity module management system, a second integrated circuit card identifier request comprising the international mobile subscriber identity as a query parameter;
      denying, if the first integrated circuit card identifier and the second integrated circuit card identifier do not match, application of the service credit; and
      performing, if the first integrated circuit card identifier and the second integrated circuit card identifier match, still further operations comprising:
        generating and transmitting, to the prepaid system, an apply service credit request to the prepaid system comprising the credit value; and
        receiving, from the prepaid system, an apply service credit response comprising a notification that the credit value of the service credit has been applied to the new customer account.

18. The tangible computer-readable storage medium of claim 17, wherein the computer-executable instructions that, when executed by the processor, cause the processor to perform the still further operations, cause the processor to, prior to generating the apply service credit request:

generate and transmit, to a billing system, an account information request comprising the first mobile subscriber number as a query parameter;

receive an account information response comprising the account information associated with the first mobile subscriber number; and determine, using the account information, based upon a business rule, whether to permit or deny application of the service credit, wherein the business rule comprises at least one type of rule selected from a group consisting of:

an account type-based rule employing one or both of a list of all account types that are not eligible for service credit and a list of all account types that are eligible for service credit; and a tenure-based rule used to enforce credit eligibility for customer accounts based upon at least one time factor selected from a group consisting of a time since a particular customer account was activated and a time since a particular customer account was given service credit.

19. The tangible computer-readable storage medium of claim 17, wherein the computer-executable instructions, when executed by the processor, cause the processor to send, to the device, a credit notification indicating that the service credit has been applied to the new customer account.

20. The tangible computer-readable storage medium of claim 17, wherein the computer-executable instructions that, when executed by the processor, cause the processor to receive the trigger message from the device, cause the processor to receive, from a power-on event trigger application stored on the subscriber identity module, the trigger message in response to the device being powered-on for the first time with the subscriber identity module installed.

* * * * *